United States Patent
Shelef et al.

(10) Patent No.: US 8,983,114 B2
(45) Date of Patent: Mar. 17, 2015

(54) METHODS AND SYSTEMS FOR DETECTION AND CHARACTERIZATION OF CHANNEL SYSTEMS

(71) Applicants: Eitan Shelef, Stanford, CA (US); Jesse Lomask, Oakland, CA (US); Andrea Fildani, Danville, CA (US)

(72) Inventors: Eitan Shelef, Stanford, CA (US); Jesse Lomask, Oakland, CA (US); Andrea Fildani, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 309 days.

(21) Appl. No.: 13/706,148

(22) Filed: Dec. 5, 2012

(65) Prior Publication Data

US 2014/0153785 A1  Jun. 5, 2014

(51) Int. Cl.
*G06K 9/00* (2006.01)
*G06T 7/00* (2006.01)

(52) U.S. Cl.
CPC .......... *G06K 9/00624* (2013.01); *G06T 7/0083* (2013.01); *G06T 7/0095* (2013.01); *G06T 2207/10032* (2013.01); *G06T 2207/20064* (2013.01); *G06T 2207/30181* (2013.01)
USPC ....................................................... 382/100

(58) Field of Classification Search
None
See application file for complete search history.

(56) References Cited

U.S. PATENT DOCUMENTS

2005/0010366 A1   1/2005   Castagna et al.

OTHER PUBLICATIONS

Passalacqua, Paola et. al, "A geometric framework for channel network extraction from lidar: Nonlinear diffusion and geodesic paths," Journal of Geophysical Research: Earth Surface; vol. 115, Issue F1, Mar. 2010.*
Lashermes, Bruno, Efi Foufoula- Georgiou, and William E. Dietrich. "Channel network extraction from high resolution topography using wavelets." Geophysical Research Letters 34, No. 23 (2007).*
Pirotti, Francesco, and Paolo Tarolli. "Suitability of LiDAR point density and derived landform curvature maps for channel network extraction." Hydrological Processes 24, No. 9 (2010): 1187-1197.*
Hilley et al., 2010, Morphologic dating of fault scarps using airborne laser swath mapping (ALSM) data. Geophysical Research Letters, 37, L04301.
Bergeaud, François, et al.; "Processing Images and Sounds with Matching Pursuits"; XP-001064975, Courant Institute of Mathematical Sciences, SPIE vol. 2569, pp. 2-13.
Chaudhuri, S., et al.; "Detection of Blood Vessels in Retinal Images Using Two-Dimensional Matched Filters"; XP-002674070, IEEE Transactions on Medical Imaging, vol. 8, No. 3, Sep. 1989, pp. 263-269.

(Continued)

*Primary Examiner* — Atiba O Fitzpatrick
*Assistant Examiner* — Thomas A James
(74) *Attorney, Agent, or Firm* — Albert K. Shung

(57) ABSTRACT

A computer implemented method for detecting a channel system comprises importing channel data, wherein the channel data includes intensity measurements associated with locations in the channel system. The method further comprises calculating, by a processor, directional first derivative data of the intensity measurements; selecting a plurality of localized test wavelets; calculating, by the processor, a plurality of fit-measures, wherein the plurality of fit-measures indicate correlations between the directional first derivatives and the plurality of localized test wavelets; and determining a plurality of selected wavelets from the plurality of localized test wavelets based on the plurality of fit-measures, wherein the plurality of selected wavelets model the channel system.

29 Claims, 20 Drawing Sheets

(56) References Cited

OTHER PUBLICATIONS

Lashermes, B., et al.; "Channel Network Extraction from High Resolution Topography Using Wavelets"; Geophysical Research Letters, vol. 34, 2007, L23S04, pp. 1-6.

Shen, D., et al.; "Area Partitioning for Channel Network Extraction Using Digital Elevation Models and Remote Sensing"; XP-11403428, IEEE Geoscience and Remote Sensing Letters, vol. 9, No. 2, Mar. 2012, pp. 194-198.

Tay, Lea Tien, et al.; "Analysis of Geophysical Networks Derived from Multiscale Digital Elevation Models: A Morphological Approach"; IEEE Geoscience and Remote Sensing Letters, vol. 2, No. 4, Oct. 2005, pp. 399-403.

International Search Report, mailed Mar. 6, 2014, during the prosecution of International Application No. PCT/US2013/071807.

Written Opinion of the International Searching Authority, mailed Mar. 6, 2014, during the prosecution of International Application No. PCT/US2013/071807.

* cited by examiner

METHODS AND SYSTEMS FOR DETECTION AND CHARACTERIZATION OF CHANNEL SYSTEMS

TECHNICAL FIELD

The present disclosure relates generally to methods and systems for detecting and characterizing channel systems and in particular to using wavelet analysis for the same.

BACKGROUND

Detection and characterization of channel systems provide valuable geological information about earth's surfaces or sub-surfaces. For example, stream systems on a land or on a seafloor provide information about the changes in those streams and their surroundings throughout their geological evolution.

Various techniques exist for imaging segments of channel systems in plan view. These techniques include seismic imaging, digital topography including digital elevation models (DEMs), and air photos. These imaging techniques can result in high resolution images, from which information can be derived about various properties such as the elevation (height or depth), or rock structure of various segments of the channel system. Some imaging techniques can provide a resolution of several data points per square meter. The imaging techniques, however, often show segments of a channel system that distinctly differ from their surroundings and often do not clearly connect to other segments. The image, therefore, may look to a user as a network of disconnected segments. Moreover, the imaging technique does not provide quantitative information related to characteristics of the channel system, such as its age, drainage area, or smoothness.

Accurate and reproducible techniques have been lacking detecting or connecting various segments of channels. Existing techniques often use visual methods in which a user inspects an image or the corresponding data and outlines the possible boundaries of segments of a channel system or connects those segments to form the entire channel system. These techniques are often inaccurate, inefficient, and irreproducible, because they depend on an objective judgment of the user.

Therefore, what is needed is an efficient, reproducible, and automated technique for the detection and characterization of channel systems based on imaging data sets of various types.

SUMMARY

In various embodiments, a computer implemented method for detecting a channel system comprises importing channel data, wherein the channel data includes intensity measurements associated with locations in the channel system; calculating, by a processor, directional first derivative data of the intensity measurements; selecting a plurality of localized test wavelets; calculating, by the processor, a plurality of fit-measures, wherein the plurality of fit-measures indicate correlations between the directional first derivatives and the plurality of localized test wavelets; and determining a plurality of selected wavelets from the plurality of localized test wavelets based on the plurality of fit-measures, wherein the plurality of selected wavelets model the channel system.

In some embodiments, each of the plurality of selected wavelets is centered at a corresponding point of the channel system and has an orientation that is perpendicular to a direction of a corresponding directional first derivative at the corresponding point.

In some embodiments, the plurality of localized test wavelets include a plurality of wavelets having different orientations. In some embodiments, the plurality of localized test wavelets include a plurality of wavelets having different widths.

In some embodiments, the channel data correspond to a plurality of grid points and the plurality of selected wavelets are assigned to the plurality of grid points, the method further comprising calculating a plurality of signal to noise values for each of the plurality of grid points, wherein a signal to noise value for one grid point is an increasing function of the calculated fit-measure of the selected wavelet assigned to the one grid point. In some embodiments, calculating the plurality of fit-measures include calculating a plurality of convolutions. In some embodiments, calculating the plurality of convolutions is performed in a Fourier space.

In some embodiments, calculating a plurality of fit-measures includes calculating a first fit-measure between the directional first derivatives and a first test wavelet localized at one location in the channel system; and calculating a second fit-measure between the directional first derivatives and a second test wavelet that is localized at the one location and is different from the first wavelet; and wherein determining the plurality of selected wavelets includes selecting, as a selected wavelet, one of the first test wavelet and the second test wavelet for which the corresponding calculated fit-measure is larger.

In some embodiments, a computer implemented method is for analyzing data for a channel system, wherein the data correspond to a plurality of grid points that represent a surface containing the channel system. The method comprises storing a plurality of fit-measures assigned to the plurality of grid points, wherein the plurality of fit-measures indicate correlations between a plurality of wavelets and directional first derivates of the data for the channel system; determining a plurality of links connecting a subset of the plurality of grid points; assigning to a subset of the plurality of links a plurality of link costs, wherein the plurality of link costs are based on the plurality of fit-measures; selecting a focal grid point; and determining, by a processor, a plurality of channel paths each connecting the focal grid point to one of a subset of the plurality of grid points, wherein the plurality of channel paths is determined based on the plurality of link costs.

In some embodiments, determining the plurality of channel paths from the focal grid point to one grid point of the plurality of grid points includes determining a plurality of paths from the focal grid point to the one grid point; assigning to each of the plurality of paths a path cost, wherein the path cost for one path is an increasing function of a subset of the link costs for links covered by the one path; based on the path costs, selecting a path among the plurality of paths as the determined channel path from the focal grid point to the one grid point.

In some embodiments, the selected path has a minimum path cost among the plurality of paths. In some embodiments, the method further comprises assigning a plurality of wavelet parameters to the plurality of grid points; and increasing a link cost for one link of the plurality of links based on a difference between values of wavelet parameters for the grid points connected by the one link.

In some embodiments, one wavelet is assigned to one grid point of the plurality of grid points and wherein one wavelet parameter assigned to the one grid point includes a width of the one wavelet, a standard deviation of the one wavelet, or an orientation of the one wavelet.

In some embodiments, the method further comprises setting a constraint on a subset of the plurality of grid points or on a subset of the plurality of links based on the plurality of wavelet parameters, wherein one or more of the plurality of channel paths satisfies the constraint. In some embodiments, the constraint includes blocking the subset from being included in a subset of the plurality of channel paths. In some embodiments, a link connecting a first grid point and a second grid point neighboring the first grid point is blocked from being included in a channel path if a difference between values of one wavelet parameter for the first and second grid points exceeds a threshold difference value.

In some embodiments, determining the plurality of channel paths includes removing a subset of the plurality of links from being included in the plurality of channel paths, wherein for each link in the subset of the plurality of links the link cost exceeds a link cost maximum. In some embodiments, determining one of the plurality of channel paths from the focal point to one grid point of the plurality of grid points includes determining a lowest cost path from the focal point to the one grid point using a Dijkstra algorithm.

In some embodiments, the method further comprises assigning to a subset of the plurality of links a plurality of focal link costs, wherein the plurality of focal link costs are below a threshold cost value; and determining, by a processor, the plurality of channel paths such that a subset of the plurality of channel paths overlap one or more of the low-cost subset of the plurality of links. In some embodiments, the method further comprises assigning statistical measures to the channel system.

In some embodiments, the statistical measures comprise channel orders, channel widths, channel lengths, or number of first order basins. In some embodiments, assigning statistical measures comprises assigning stream directions to a subset of the plurality of channel paths and drainage areas to a subset of the plurality of grid points, wherein a drainage area assigned to one grid point is proportional to a number of grid points that are located on the same channel path as the one grid point and are upstream on that channel path compared to the one grid point.

In some embodiments, a test wavelet is based on a diffusion function and wherein the statistical measures include a morphologic age of a wavelet included in the channel system. In some embodiments, the plurality of fit-measures are a plurality of signal to noise ratios.

In some embodiments, a system for detecting a channel system comprises a detector module configured to import channel data, wherein the channel data includes intensity measurements associated with locations in the channel system; calculate directional first derivative data of the intensity measurements; selecting a plurality of localized test wavelets; calculate a plurality of fit-measures, wherein the plurality of fit-measures indicate correlations between the directional first derivatives and the plurality of localized test wavelets; and determine a plurality of selected wavelets from the plurality of localized test wavelets based on the plurality of fit-measures, wherein the plurality of selected wavelets model the channel system.

In some embodiments, the system further comprises a connector module for analyzing data for the channel system, wherein the data correspond to a plurality of grid points that represent a surface containing the channel system, wherein the connector module is configured to store a plurality of fit-measures assigned to the plurality of grid points, wherein the plurality of fit-measures indicate correlations between a plurality of wavelets and directional first derivates of the data for the channel system; determine a plurality of links connecting a subset of the plurality of grid points; assign to a subset of the plurality of links a plurality of link costs, wherein the plurality of link costs are based on the plurality of fit-measures; select a focal grid point; and determine a plurality of channel paths each connecting the focal grid point to one of a subset of the plurality of grid points, wherein the plurality of channel paths is determined based on the plurality of link costs.

In some embodiments, a system for analyzing data for a channel system, wherein the data correspond to a plurality of grid points that represent a surface containing the channel system, the system comprising a connector module, wherein the connector module is configured to store a plurality of fit-measures assigned to the plurality of grid points, wherein the plurality of fit-measures indicate correlations between a plurality of wavelets and directional first derivates of the data for the channel system; determine a plurality of links connecting a subset of the plurality of grid points; assign to a subset of the plurality of links a plurality of link costs, wherein the plurality of link costs are based on the plurality of fit-measures; select a focal grid point; and determine a plurality of channel paths each connecting the focal grid point to one of a subset of the plurality of grid points, wherein the plurality of channel paths is determined based on the plurality of link costs.

In some embodiments a non-transitory computer-readable medium stores instructions that, when executed by one or more computers, causes the one or more computers to perform a method for detecting a channel system, the method comprising importing channel data, wherein the channel data includes intensity measurements associated with locations in the channel system; calculating, by a processor, directional first derivative data of the intensity measurements; selecting a plurality of localized test wavelets; calculating, by the processor, a plurality of fit-measures, wherein the plurality of fit-measures indicate correlations between the directional first derivatives and the plurality of localized test wavelets; and determining a plurality of selected wavelets from the plurality of localized test wavelets based on the plurality of fit-measures, wherein the plurality of selected wavelets model the channel system.

In some embodiments, a non-transitory computer-readable medium stores instructions that, when executed by one or more computers, causes the one or more computers to perform a method for analyzing data for a channel system, wherein the data correspond to a plurality of grid points that represent a surface containing the channel system, the method comprising storing a plurality of fit-measures assigned to the plurality of grid points, wherein the plurality of fit-measures indicate correlations between a plurality of wavelets and directional first derivates of the data for the channel system; determining a plurality of links connecting a subset of the plurality of grid points; assigning to a subset of the plurality of links a plurality of link costs, wherein the plurality of link costs are based on the plurality of fit-measures; selecting a focal grid point; and determining, by a processor, a plurality of channel paths each connecting the focal grid point to one of a subset of the plurality of grid points, wherein the plurality of channel paths is determined based on the plurality of link costs.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings.

DETAILED DESCRIPTION

Figure 1A:
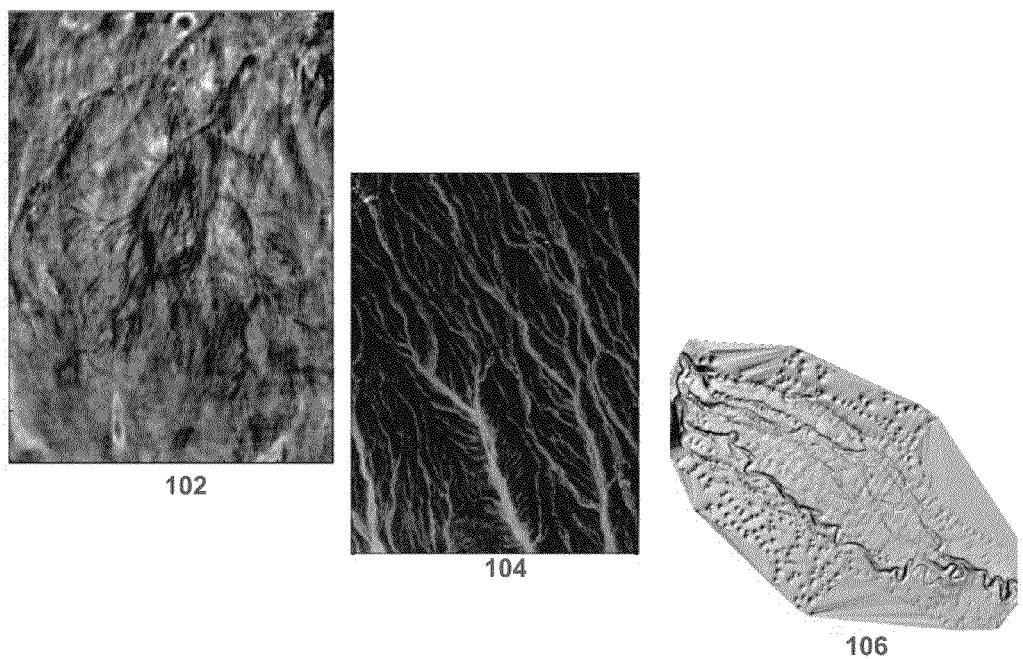
FIGS. 1A and 1B show examples of images and intensity data for various channel systems according to various embodiments.

The following detailed description refers to the accompanying drawings. Wherever possible, the same reference numbers are used in the drawings and the description to refer to the same or similar parts. Also, similarly-named elements may perform similar functions and may be similarly designed, unless specified otherwise. Numerous details are set forth to provide an understanding of the described embodiments. The embodiments may be practiced without these details. In other instances, well-known methods, procedures, and components have not been described in detail to avoid obscuring the described embodiments. While several exemplary embodiments and features are described here, modifications, adaptations, and other implementations may be possible, without departing from the spirit and scope of the invention. Accordingly, unless stated otherwise, the descriptions relate to one or more embodiments and should not be construed to limit the invention as a whole. Instead, the proper scope of the invention is defined by the appended claims.

As used in this disclosure, a subset of a set can include one or more than one, including all, members of the set. Further, as used in this disclosure, a first variable is an increasing function of a second variable if the first variable does not decrease and instead generally increases when the second variable increases. On the other hand, a first variable is a decreasing function of a second variable if the first variable does not increase and instead generally decreases when the second variable increases. In some embodiment, a first variable is an increasing or a decreasing function of a second variable if, respectively, the first variable is directly or inversely proportional to the second variable.

Some embodiments disclose automated detection and characterization of submarine and subareal channels using wavelet analysis. In various embodiments, the form, extent, and plan-view geometry of natural channels are used to infer bank-full discharge, sinuosity, and relations between these parameters and catchment area, low width, and low depth.

The extraction of channel morphometry usually requires field measurement or interpretation of plan-view and cross-sectional data from maps, air photos and seismic data. Various embodiments use an automated method for channel detection from plan view data of various types, including air photos, seismic imagery, and digital elevation models (DEMs).

Some embodiments identify channels by comparing the directional derivative of the data with that of an idealized channel using wavelet analysis. The best fitting form provides channel orientation, width, relief, and sharpness of the channel boundary. In some embodiments, where diffusive processes operate to smooth channel risers through time, relative dating of channel abandonment is carried out based on the smoothness of their boundaries. Various embodiments connect the detected channels in a manner that highlights spatial patterns of channel convergence. Some embodiments enable a user to enforce constraints on the channel system to produce various interpretations of the channel system configuration.

Figure 1B:
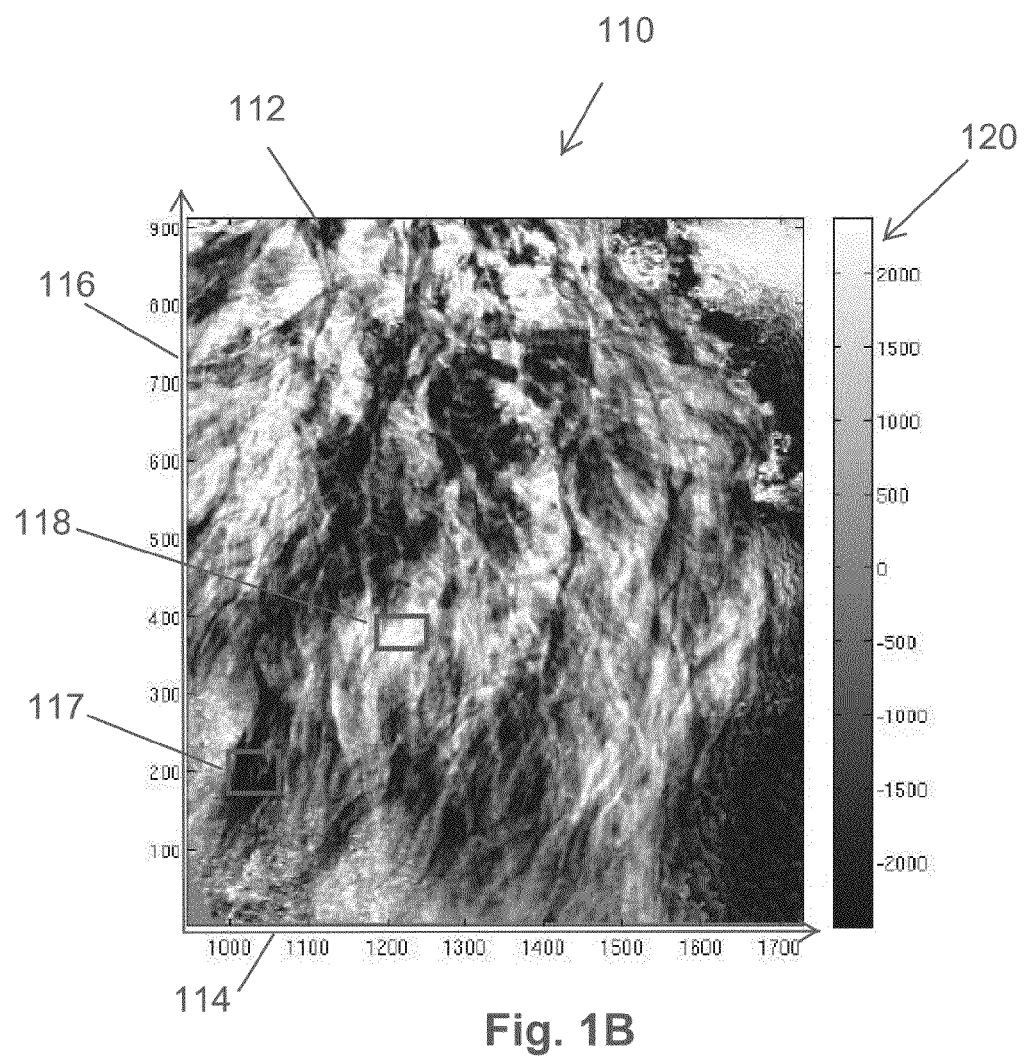

Various embodiments import channel data from an data collection system and based on the imported data detect and analyze a channel system. FIGS. 1A and 1B show examples of channel data for various channel systems according to various embodiments. In various embodiments, channel data include one or more of various types of data, such as seismic data, photographic data, or DEM data. In various embodiments, channel data indicate intensities of the collected data for locations in a surface that includes the channel system.

In various embodiments, the surface includes a landscape, a seafloor, or a layer on the surface or close to the surface of the earth. In various embodiments, intensities of the collected data include intensities of seismic data, brightness or contrast level in imaging data, or intensities of DEM data. In some embodiments, intensity data include elevation data for points on a landscape or a seafloor. In some embodiments, the channel data are provided for points on a grid. In various embodiments, the grid is a regular grid in which the distances of neighboring grid points are constant. In some embodiments, the grid is an irregular grid, in which the distances between various neighboring grids vary. In some embodiments, the grid is a tree structure. In some embodiments, a channel system is characterized as an elongated feature in the surface for which the data have intensities that are different from the surroundings.

FIG. 1A depicts a seismic image 102, an air photo image 104, and a digital elevation model (DEM) image 106 of various channel systems according to some embodiments. In some embodiments, a seismic image is generated via a surface seismic survey. In some embodiments, a seismic imaging technology generates localized seismic waves, collects the reflected waves, and based on the reflected waves generates a seismic image of the interfaces in the surface or the subsurface. Those interfaces include interfaces between the surface of a landscape and the air, interfaces between the surface of a seafloor and the sea, or interfaces between subsurface formations. The technique, thus, provides an image illustrating intensities of seismic waves for the surface at different points of the surface.

Similarly, an air photo image such as image 104 is an image of the surface of a land or a sea floor taken from above by using a camera installed on, for example, an airplane or a satellite. A digital elevation model (DEM) such as image 106 is a model of a surface. In various embodiments, a DEM image is generated through direct survey of the surface, or by remote sensing techniques using, for example, radar technologies.

In various embodiments, plan view images include information about the surface. FIG. 1B shows exemplary seismic intensity data derived from a seismic image, according to an embodiments. In particular, FIG. 1B shows an image 110 indicating seismic information in a grayscale and an intensity scale legend 120 for reading the grayscale. Image 110 shows the intensity values for a surface 112. Each point of the surface 112 can be specified by its coordinates shown on the axes 114 and 116. In FIG. 1B, horizontal axis 114 covers abscissa coordinates that include the range 1000 to 1700 in a specific coordinate system. Vertical axis 116, on the other hand, covers ordinate coordinates that include the range 100 to 900 in the specific coordinate system. In some embodiments, surface 112 is divided into a grid that is a discrete network of nodes located at a discrete set of abscissa and ordinates. In some embodiments, the resolution of the grid is determined by the resolution of the image. In some embodiments, a data point is provided for each pixel of image 110.

Legend 120 provides a grayscale guide for determining the intensity of each point in image 110 according to an embodiment. In FIG. 1B, legend 120 covers a range of intensities that includes negative intensities from around −2000 in a specific unit to positive intensities to around 2000 in the specific unit. Further, legend 120 indicates that the brightness of a point is an increasing function of its intensity. That is, brighter points are located higher compared to darker points. Based on legend 120, therefore, image 110 shows that surface 112 includes deep sections such as section 117 depicted in a dark color. Further, surface 112 includes high sections such as section 118 depicted in a bright color. In various embodiments, image 110 and legend 120 indicate relative intensities compared to a reference level.

Figure 2:
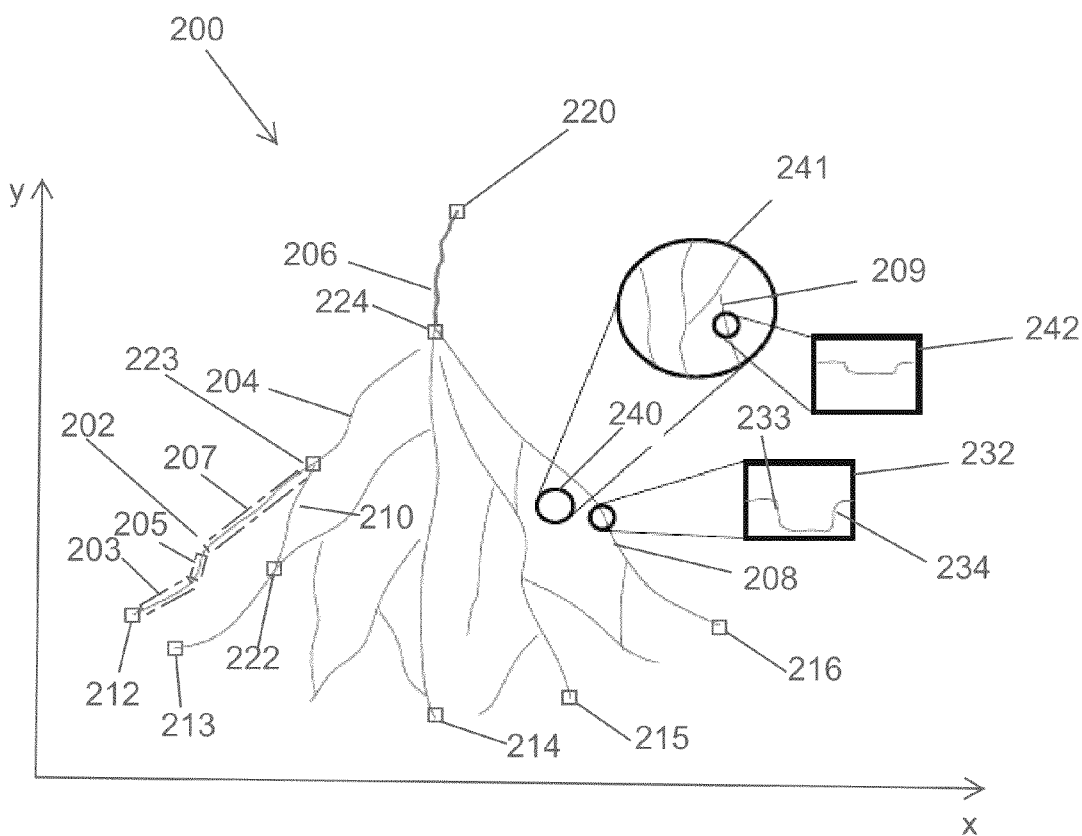
FIG. 2 shows a schematic of a channel system according to some embodiments.

In some embodiments, intensity data of a surface provide information about a channel system in the surface. FIG. 2 shows a schematic of a channel system 200 according to some embodiments. Channel system 200 include a plurality of branches such as branches 202, 204, and 206, and a plurality of points at the end of each branch, such as boundary points 220 and 212-216, and junction points 222-224. Each branch connects two points, each of which can be a boundary point or a junction point. For example, branch 202 connects boundary point 212 and junction point 223. Similarly, branch 204 connects junction points 223 and 224. Of various boundary points, one or more can be a destination point. A destination point is a boundary point in which a plurality of branches end. In channel system 200, for example, boundary point 220 is a destination point. In some embodiments, a channel system includes more than one smaller channel systems such as channel system 200. In such embodiments, the larger channel system may thus include more than one destination points, each for one of the smaller channel systems. In various embodiments, channel system 200 depicts a system of branches that provide various paths between various points. For example, channel system 200 depicts a path from boundary point 212 located on the boundary of channel system 200 to destination point 220. This path includes branches 202, 204, and 206. Similarly, channel system 200 depicts other paths from boundary points 212-216, or junctions points 222-224, to destination point 220.

In various embodiments, a channel system can be approximated as a union of channel segments. Each segment is a section of a branch that can be approximated as a straight section, that is, a section for which a horizontal cross section is approximately a rectangle. In some embodiments, each segment further has an intensity profile that is symmetric around the central axis of the segment and does not change along that axis. A branch may include one or more segments. For channel system 200, branch 202, for example, may be approximated as a combination of segments 203, 205, and 207.

In some embodiments, channel system 200 represents a channel through which a stream flows from higher elevations to lower elevations. In some embodiments, the direction of flow of a stream in channel system 200 is based on the change of elevation of the points along a path. In various embodiments, the paths represent channels through which a stream flows from one end point to the other end point. Various branches can join, or divide, at a junction point.

In some embodiments, for example, channel system 200 depicts a system of streams that generally flow in the positive y direction of FIG. 2. In such embodiments, branches such as branches 202 and 210 are weaker branches that join at junction points, such as point 223, forming stronger branches such as branch 204. The stronger branches in turn join at junction points such as point 224 to form stronger branches such as branch 206. Branch 206 ends at destination point 220, which could represent an outlet. In this terminology, weak or strong represent relative order in which branches join to form other branches. A branch that results from joining two or more other branches is stronger that each of those branches. In some embodiments, channel system 200 alternatively depicts a system of streams that originate at destination point 220 and flow in the negative y direction of FIG. 2. In such an image, destination point 220 represents a source.

In some embodiments, some branches can be detected as an area that is at a different intensity compared to the area on both of its boundaries. In FIG. 2, for example, cross section 232 depicts a cross section of branch 208. Cross section 232 is taken in a direction that is perpendicular to the direction of branch 208. Cross section 232 shows that branch 208 is at a lower intensity compared to the surfaces on its two boundaries. Cross section 232 is a combination of two steps, 233 and 234 that are coupled at their lower points.

In various embodiments, an image of a channel system includes branches that may not be detected by human vision. In FIG. 2, for examples, channel system 200 includes an area 240. A human observer may not see any discernible features in area 240. Alternatively, an intensity map of area 240, such as the gray scale map of FIG. 1B, does not depict any significant difference between the intensities of various pixels in area 240 and its surroundings. Area 240 may nevertheless include some features corresponding to channel system 200. Magnification 241, for example, shows some detailed features of area 240. In particular, as seen in cross section 242, area 240 includes branches such as branch 209, which are generally shallower that observable branches such as branch 208. Depending on the scale of an image, such detailed features may not be detected by a human observer and may instead require detailed analysis of the intensity data.

Figure 3:
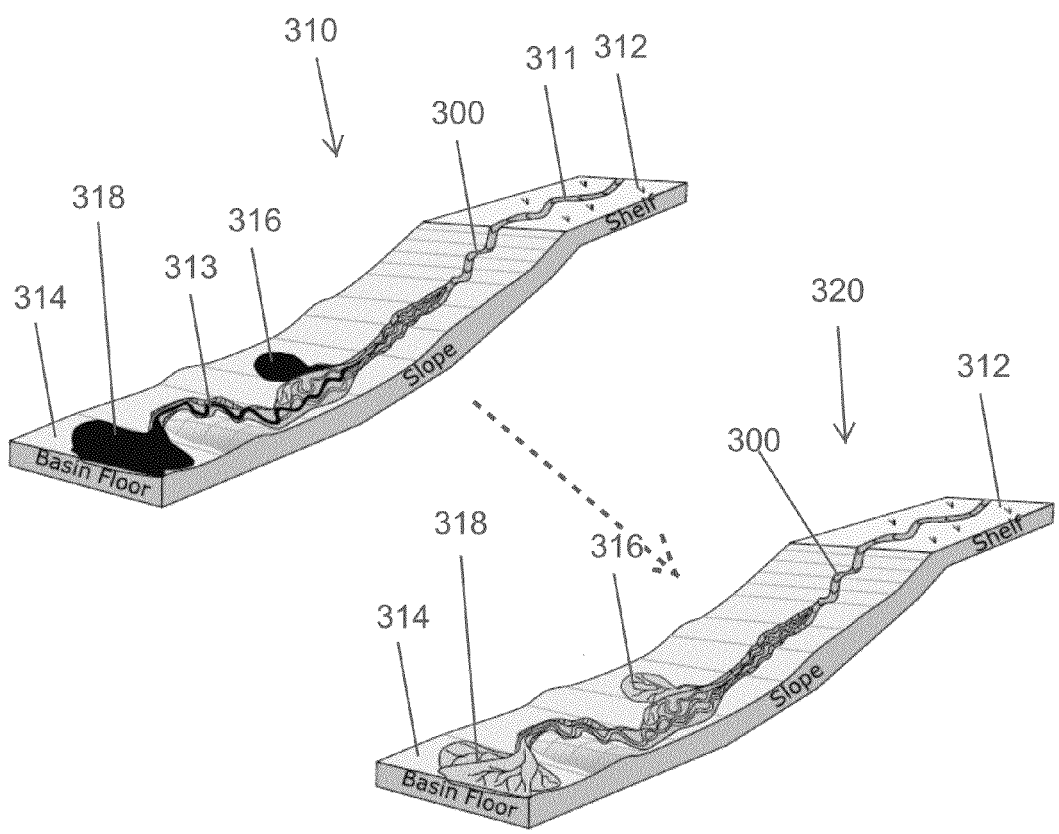
FIG. 3 illustrate schematics for applying automated detection techniques according to some embodiments.

FIG. 3 illustrate the results of applying automated detection techniques according to some embodiments. FIG. 3 includes schematics 310 and 320 of a channel system 300. Schematic 310 illustrates channel system 300 as derived from an imaging system. Schematic 320, on the other hand, illustrates channel system 300 for which details have been derived using automated channel detection techniques of some embodiments.

Schematic 310 depicts a model of a channel system 300 based on intensity data derived from an imaging technique. Schematic 310 shows that channel system 300 starts at a branch 311 located at a high elevation shelf 312. Channel system 200 further ends at a basin floor 314. Elevation image shown in schematic 310 thus reveal some branches such as branch 311 or a branch 313 located near basin floor 314. The quality of intensity data, however, is poor for areas such as a middle area 316 or a lower basin area 318.

Schematic 320 depicts channel system 300 after data analysis and improvement techniques have been applied schematic 310 according to some embodiments. The detection system derives some characteristics of the channel system from high quality data, such as those around branches 311 or 313. The detection system applies the derived characteristics to areas such as middle area 316 or a lower basin area 318, which have data with poor quality data, to derive a more detailed features of those areas.

Figure 4:
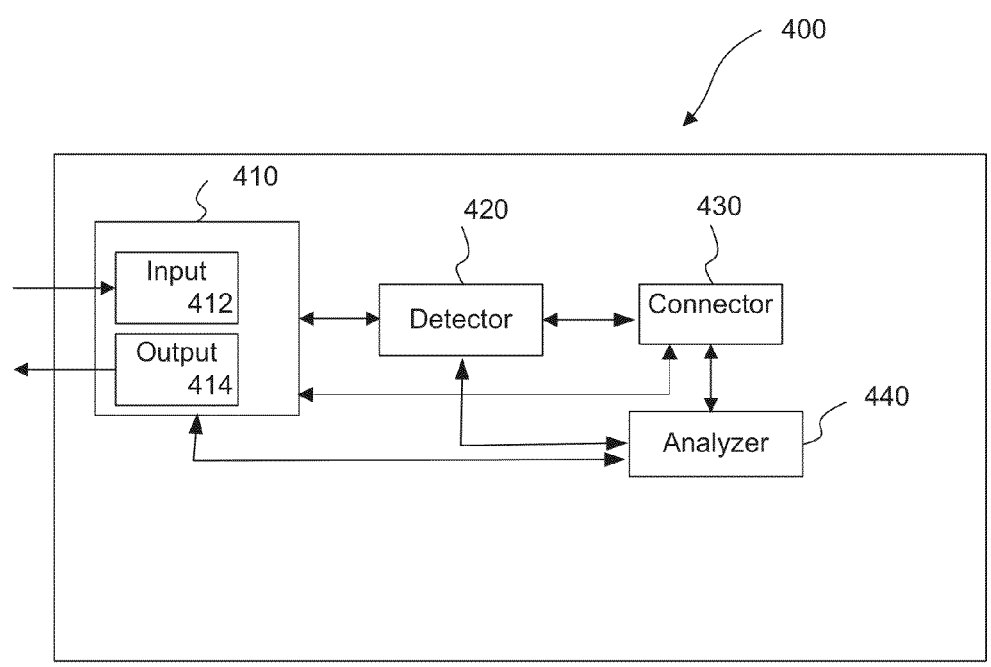
FIG. 4 is a block diagram of a channel detection system according to various embodiments.

FIG. 4 is a block diagram of a channel detection system 400 according to various embodiments. Channel detection system 400 is configured to detect and analyze channel systems. Channel detection system 400 includes an I/O interface 410, a detector module 420, a connector module 430, and an analyzer module 440.

In various embodiments, one or more of modules disclosed in this disclosure are implemented via one or more computer processors executing software programs for performing the functionality of the corresponding modules. In some embodiments, one or more of the disclosed modules are implemented via one or more hardware modules executing firmware for performing the functionality of the corresponding modules. In various embodiments, one or more of the disclosed modules include storage media for storing data used by the module, or software or firmware programs executed by the module. In various embodiments, one or more of the disclosed modules or disclosed storage media are internal or external to the disclosed systems. In some embodiments, one or more of the disclosed modules or storage media are implemented via a computing "cloud", to which the disclosed system connects via an internet and accordingly uses the external module or storage medium. In some embodiments, the disclosed storage media for storing information include non-transitory computer-readable media, such as a CD-ROM, a computer storage, e.g., a hard disk, or a flash memory. Further, in various embodiments, one or more of the storage media are non-transitory computer-readable media store information or software programs executed by various modules or implementing various methods or flow charts disclosed herein.

In various embodiments, I/O interface 410 is configured to receive inputs and to provide outputs. In some embodiments, I/O interface 410 is an interface for receiving and sending data to a user or to another automated system. In various embodiments, I/O interface 410 includes an input interface 412 and an output interface 414. Input interface 412 is configured to receive intensity data such as those provided by seismic imaging, DEMs, or air photos. Output interface 414, on the other hand, is configured to output information related to detected channel system, such as images of the segments or data related to the segments, as explained below in more detail. In some embodiments, I/O interface 410 includes one or more of an internet interface, a data reader, a mouse, a keyboard, a display, a speaker, a touch screen, or a printer.

According to various embodiments, detector module 420 is configured to receive data from I/O interface 410 and to detect various characteristics of a channel system from the received data. In some embodiments, detector module 420 receives intensity data for a surface and from the data detects segments of a channel system located in the surface. In some embodiments, detector module 420 models the segments as localized wavelets, in a manner explained below in detail. In some embodiments, detector module 420 provides the results to I/O interface 410 to be output to a user or to another system. In some embodiments, detector module 420 provides the results to connector module 430 or analyzer module 440 for further analysis.

Connector module 430 analyzes information provided by detector module 420 and based on those data generates information for a connected channel system according to some embodiments. In various embodiments, connector module 430 receives from detector module 420 information about a plurality of segments of the channel system. Analyzing the segment data, connector module 430 generates models of branches of the channel system that connect the segments. By combining these connecting branches with the segments, connector module 430 generates a connected model of the channel system. Connector module 430 also derives various data related to the channel system, as explained below in more detail. In some embodiments, connector module 430 provides the results to I/O interface 410 to be output to a user or to another system. In some embodiments, connector module 430 provides the results to analyzer module 440 for further analysis.

Analyzer module 440 is configured to receive information about the segments or the connected channel system and analyze that information according to various embodiments. In some embodiments, analyzer module 440 receive segment related data from detector module 420 or connected channel system data from connector module 430. Further, in various embodiments, analyzer module 440 derives various characteristics of the channel system from the received data, as explained below in more detail. Moreover, in some embodiments and as explained below, analyzer module 440 sends the results to detector module 420 or connector module 430 to be used for further analysis, or to the I/O interface 410.

Figure 5A:
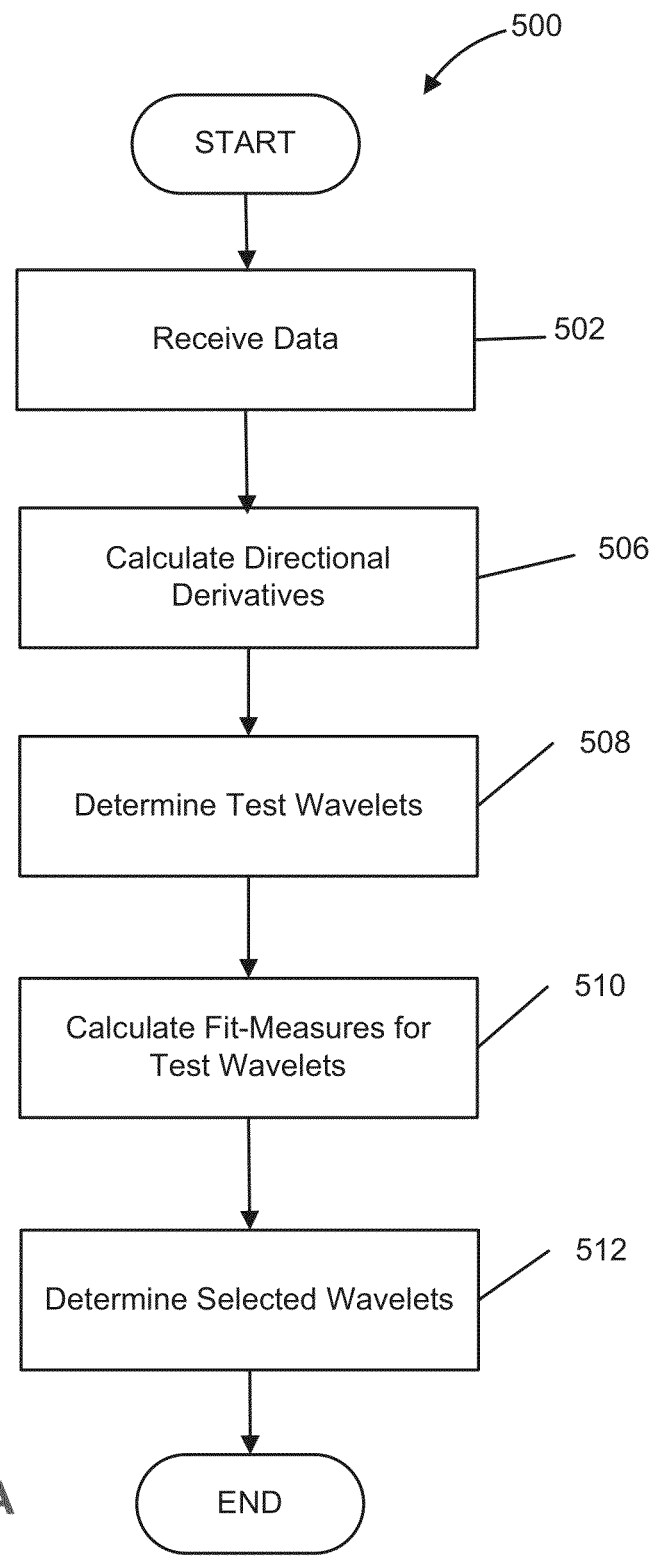
FIGS. 5A and 5B show flow charts for detecting channel segments according to some embodiments.

FIG. 5A shows a flow chart 500 for detecting channel segments according to some embodiments. In some embodiments, flow chart 500 is performed by a channel detection system, such as channel detection system 400. In some embodiments, flow chart 500 is performed by a segment detector such as detector module 420. For convenience of illustration, in what follows, flow chart 500 is assumed to be performed by a detector module.

Referring to FIG. 5A, in block 502, the detector module receives intensity data. In some embodiments, intensity data is imported from an imaging system such as a seismic imaging system, a DEM imaging system, or an air photo imaging system. In various embodiments, intensity data is data related to a seismic image, an air photo image, or a DEM image, such as images 102, 104, and 106 in FIG. 1A. In various embodiments, the received data include intensity data such as those discussed in relation to FIG. 1B.

In some embodiments, the intensity data are associated with some grid points, that are, nodes of a grid. In some embodiments, the grid is a regular grid. In some other embodiments, the grid is an irregular grid. In some embodiments, a grid is defined for the surface and the received data are projected on the nodes of the grid. In some embodiments, the value of the intensity for each grid point is an average of the intensities in an area around the grid point.

Figure 6A:
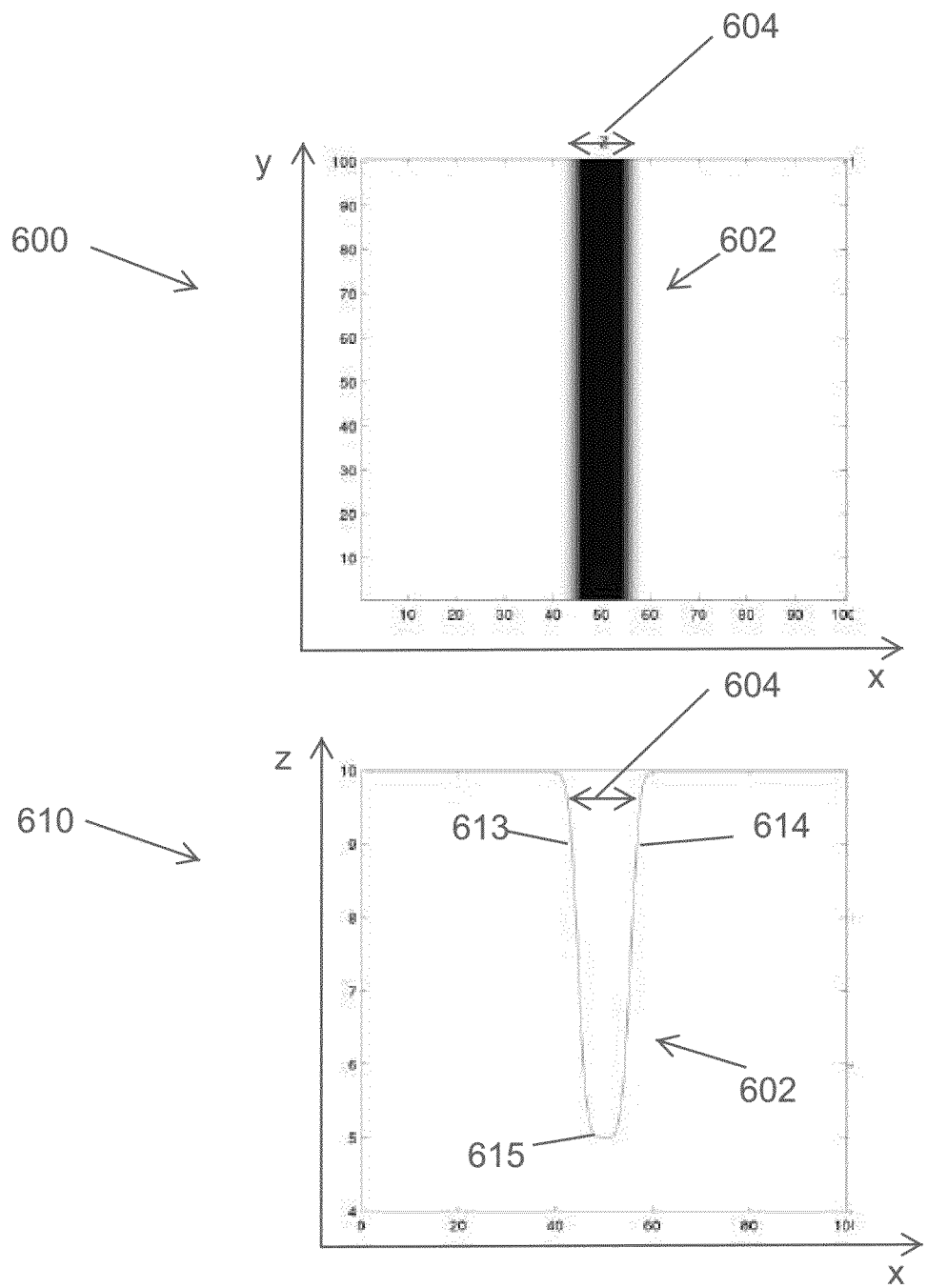
FIG. 6A shows an exemplary segment depicted in real space according to some embodiments.

In various embodiments, the channel system is divided into a plurality of segments. In some embodiments, each segment of a channel system is associated with a grid point. In various embodiments, a channel segment associated with a grid point corresponds to data for a set of grid points that are approximately centered at that grid point. FIG. 6A shows an exemplary segment depicted in real space according to some embodiments. In particular, FIG. 6A shows a profile 602 for a segment of a channel system in a plan view 600 and cross-sectional view 610. Plan view 600 shows intensity data for segment 602. In plan view 600, each point has three coordinates along the three Cartesian axes, x, y, and z. In plan view 600, coordinate axes x and y are shown and coordinate axis z is perpendicular to and pointing up from the plane of view 600. The x and y coordinates of a point correspond to the location of the point in the plane of the surface of its surroundings, e.g., landscape. The z coordinate of a point in the surface is proportional to the intensity of the data for the point. In view 600, the z coordinate of a point is depicted by the color of the point in a grayscale, in a manner similar to that discussed in FIG. 1B. The values of the three coordinates in views 600 and 610 are in an arbitrary scale and for illustration purposes. Also, for illustration purposes, segment 602 has been depicted as a straight segment that is parallel to the y axis. That is, for exemplary segment 602, the intensity is a function of the x coordinate and not a function of the y coordinate.

Cross-sectional view 610 shows intensity information of segment 602 along a cross section parallel to the x axis. Each point in view 610, therefore, represents the x and z coordinates of a point with an arbitrary y coordinate in the plan view 600. As seen in views 600 and 610, channel segment 602 has a width 604. In some embodiments, width 604 is defined as the distance between the points in which walls 613 and 614 of the channel segment join the plateau of the surrounding surface.

As seen in views 600 and 610, illustrative segment 602 has an intensity that is the lowest along the straight line x=50. Further, segment 602 rises symmetrically on the two sides of that symmetry line and reaches a plateau approximately along the lines x=40 and x=60. As seen in cross-sectional view 610, in some embodiments segment 602 can be modeled as a combination of two step-like functions for walls 613 and 614, which face each other and which join at bottom 615. In FIG. 600, bottom 615 represents the line x=50. In view 610, this line is a symmetry axis for the intensity data of segment 602. Alternatively, in view 600, the surface x=50 is a symmetry surface for segment 602.

In various embodiments, a channel system includes a plurality of segments with different characteristics. Different segments of a channel system can have different orientations or different shapes. Some segments can have a straight shape similar to the shape of illustrative segment 602. Some other segments can have non-straight shapes and, for example, include some curved parts. In some embodiments, each segment is approximated as a straight segment with its own local coordinate axes. Thus, for each segment, the local x and y axes are defined on the plan view, such that the local y axis is parallel to the segment's axis of symmetry. The direction of the local y axis with respect to a global y axis defines the orientation of the segment.

Referring back to FIG. 5A, in various embodiments, the detector module models segments of a channel system in a derivative space. To that end, as shown in block 506 of FIG. 5A, the detector module calculates a directional first derivative of the intensity data for each segment. In particular, at each grid point, the detector module calculates the first derivative of intensity data in the local x direction, that is, in the direction that is perpendicular to the symmetry axis of the segment.

Figure 6B:
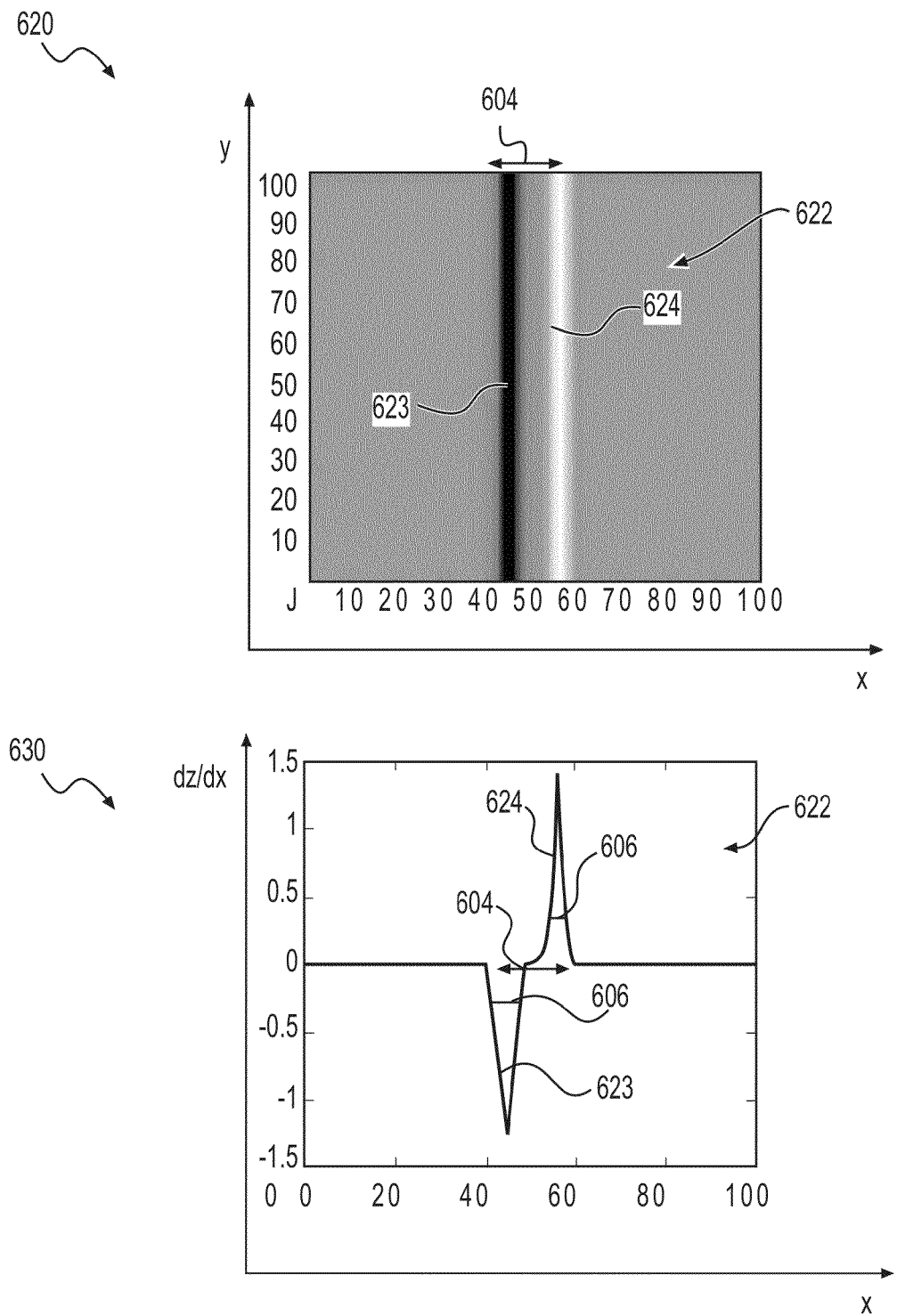
FIG. 6B shows a derivative profile of an exemplary segment in a derivative space, according to some embodiments.

FIG. 6B shows a first derivative profile 622 of segment 602 of FIG. 6A in a derivative space, according to some embodiments. In particular, derivative profile 622 includes values of dz/dx, that is, the directional first derivative of intensity data, z, in the local x direction. FIG. 6B shows the profile in a plan view 620 and in a cross-sectional view 630. In views 620 and 630, the x and y coordinates are similar to those used in views 600 and 610. The third coordinate in views 620 and 630, however, is the directional first derivative dz/dx. The grayscale at each point (x, y) in plan view 620, therefore, indicates the value of the directional first derivative of the intensity data at the point with coordinates x and y. Similarly, each point (x, dz/dx) in the derivative graph of cross-sectional view 630 indicates the value of the directional first derivative dz/dx for a point with the abscissa coordinate x and with any ordinate y.

FIG. 6B indicates that derivative profile 622 of segment 602 includes two opposing bumps. In particular, as seen in views 620 and 630, derivative profile 622 includes a negative bump 623 and a positive bump 624. In various embodiments, the distance between the peaks of the two bumps is proportional to width 604 of channel segment 602. In some embodiments, such as the one shown in FIG. 6B, width 604 is alternatively defined as the distance between the two peaks in the derivate profile of the segment. Each bump also has a spread 606. Spread 606 is a decreasing function of the steepness of walls 613 and 614. In other words, spread 606 is an increasing function of the smoothness of the walls of channel segment 602.

As discussed above, exemplary segment 602 is generally symmetric around the x=50 line. Consequently, in derivative graph 630, negative and positive bumps 623 and 624 are images of each other with respect to the point x=50. More general channel segments, however, may not show such symmetries. Nevertheless, for typical symmetric channel segments the total integral of the derivative profile 622 along the x direction equals to zero. The zero total integral results because typical channel segments have the same intensity on their two sides at which they join the surrounding plateau. Therefore, for a typical channel segment, the total algebraic volume under the derivative profile 622 in plan view 620 is zero. Similarly, the total area under the cross section of the derivative profile 622 in the cross-sectional view 630 is zero. Consequently, in derivative space, a typical channel segment has a profile with a total integral that is zero.

Various embodiments use the derivative profile of a segment to model the segment with wavelets. In some embodiments, the derivative profile is more suitable than the spatial profile, because its total integral is zero. Further, in some embodiments, the derivative profile is more suitable than higher order derivatives, because it is less noisy than higher order derivatives. In general, because taking derivatives of discrete intensity data introduces noise, it is preferable to use the lowest possible derivative to model the data.

Figure 6C:
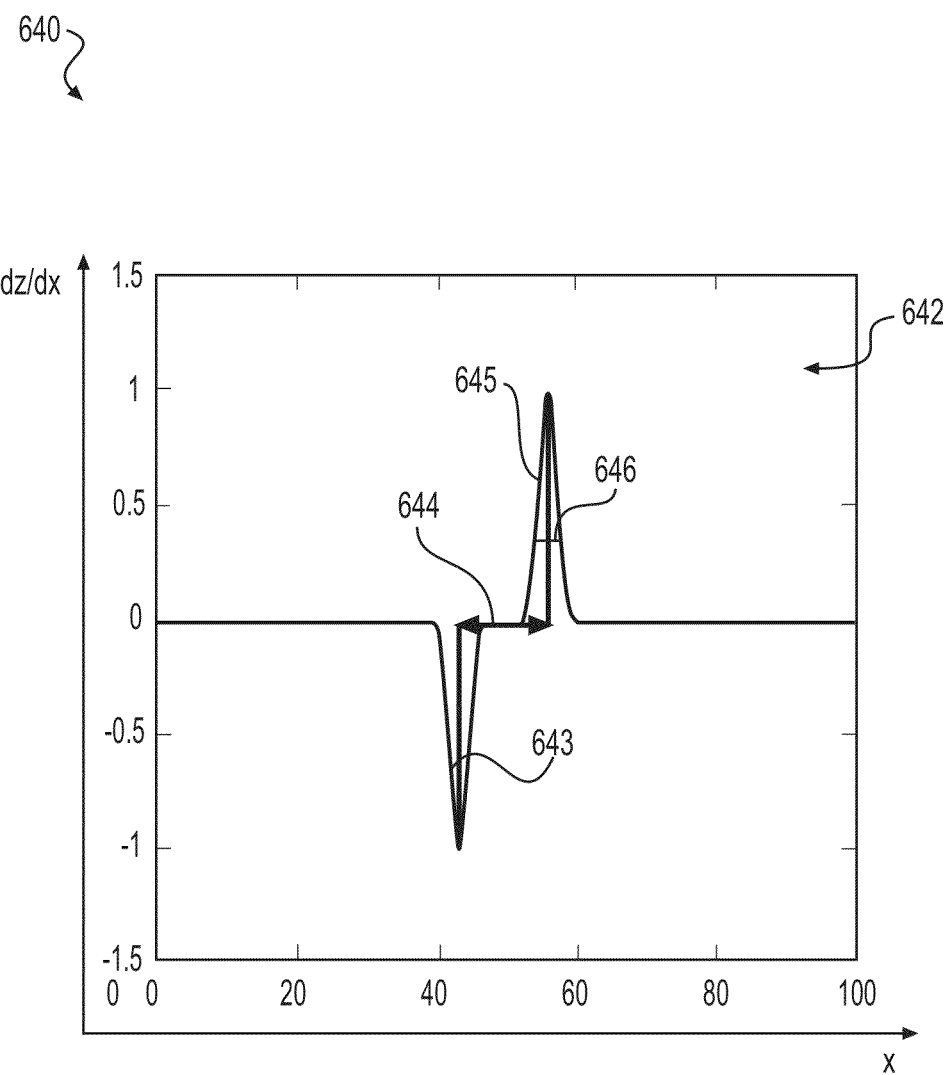
FIG. 6C shows a graph of an exemplary wavelet in a derivative space according to some embodiments.

In various embodiments, the detector module provides a dynamic model of a channel system by modeling segments of the channel system with localized wavelets in the derivative space. FIG. 6C shows a graph 640 of an exemplary wavelet 642 in a derivative space according to some embodiments. Exemplary wavelet 642 includes wavelet bumps 643 and 645, which model segment bumps 623 and 624 respectively. In some embodiments, wavelet bumps 643 and 645 are formed from two copies of the same localized peaking function (such as a truncated Gaussian), one of which is reversed and which are translated with respect to each other by the amount of a wavelet width. Generally, wavelet 642 is defined by several characteristics that include a width 644 and a spread 646. In some embodiments, width 644 is defined as a distance between the peaks of wavelet bumps 643 and 645. In some embodiments, in which wavelet bumps 643 and 645 are truncated Gaussian curves, spread 646 is proportional to the standard deviation of each Gaussian. In various embodiments, wavelet 642 is normalized. This normalization determines the amplitudes of wavelet bumps 643 and 645.

In some embodiments, each wall 613 and 614 is modeled as a fault scarp. In some of these embodiments, the intensity function for each fault scarp is modeled by a wavelet that is a shifted error function. The error function is derived from a diffusion theory for a fault scarp. In these embodiments, the first derivative of the wavelet includes two joined Gaussians. The standard deviation of each Gaussian, associated with a morphologic age k*t, is proportional to the age of the fault scarp. In these models, the value of k is associated with a diffusion rate constant and the value of t is associated with time.

In various embodiments, for each channel segment, the detector module fits a plurality of test wavelets with the segment data. As used here, test wavelets are wavelets that are examined to find the wavelet that fits the channel segment better that other examined wavelets. In various embodiments, the detector module measures the degree by which a wavelet fits a channel segment by calculating a fit-measure. In some embodiments, a fit-measure is an increasing function of the cross correlation between the wavelet and the directional derivates of the segment data. In some embodiments, to find the fit-measure, the detector module calculates a signal to noise ratio (SNR) for the wavelet. In some embodiments, the SNR for a wavelet is a normalized value of a convolution between the wavelet and the segment's directional derivatives.

In some embodiments, the detector module calculates the convolution by finding a product in the Fourier space. In particular, in some embodiments, the detector module first applies fast Fourier transformation (FFT) to the directional derivative data, and also finds the Fourier transformation (FT) of the wavelet function. Then, for each Fourier frequency, the detector module multiples the values of the FFT for the directional derivative and FT of the wavelet function to find a product value in that frequency. Finally, to find the convolution, the detector module applies reverse FFT to the product values for all frequencies.

Figure 7:
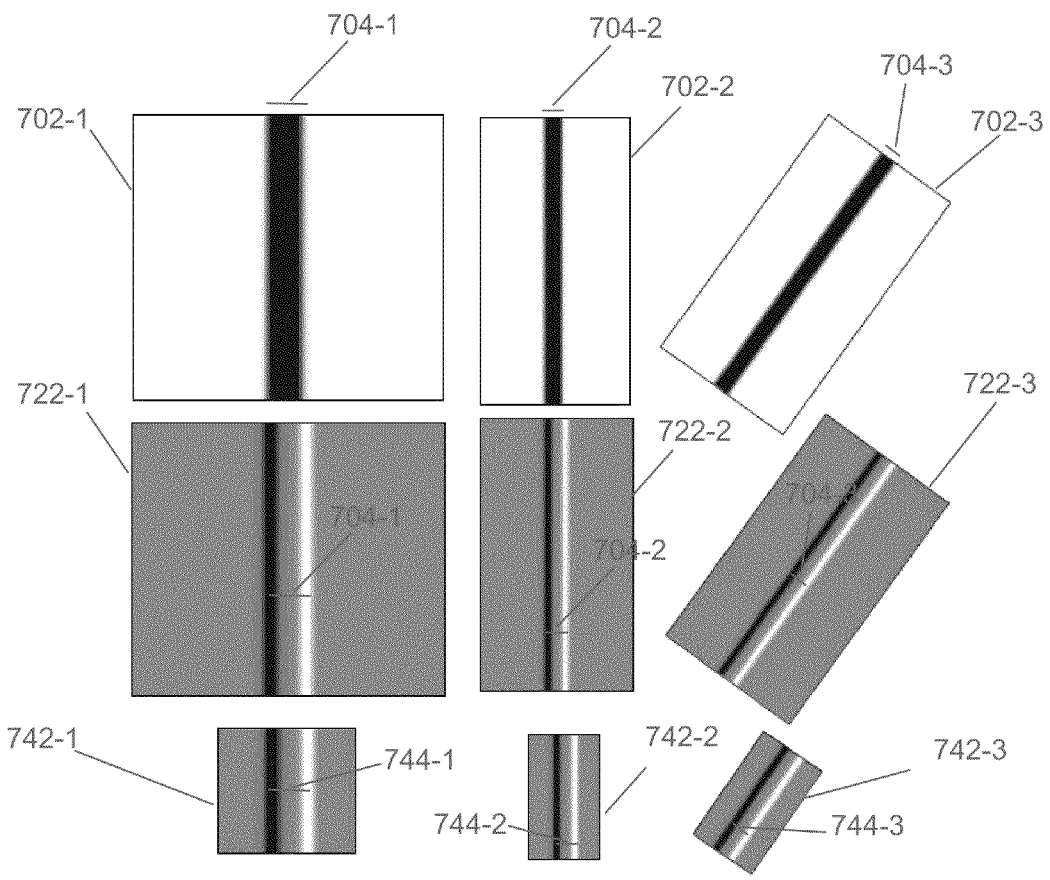
FIG. 7 illustrates different channel segments with varying characteristics and the corresponding test wavelets with similar characteristics according to some embodiments.

In various embodiments, different channel segments differ from each other in various characteristics, according to which the corresponding characteristics of the test wavelets are chosen. In some embodiments, segments and their test wavelets differ in characteristics that may include location, orientation, width, or smoothness. FIG. 7 illustrates different channel segments with varying characteristics and the corresponding test wavelets with similar characteristics according to some embodiments. In particular, FIG. 7 illustrates three different channel segments 702-1, 702-2, and 702-3 in the real space, and their directional derivatives 722-1, 722-2, and 722-3 in the derivative space. FIG. 7 also illustrates three different test wavelets 742-1, 742-2, and 742-3 in the derivative space, each used to model the corresponding one of the three channel segments.

In some embodiments, different channel segments are located at different locations in the channel system. Accordingly, in various embodiments, test wavelets for a segment are localized and centered at different grid points. In some embodiments, the wavelets are localized in the x direction by truncating the wings of a wavelet. In some embodiments, the detector module calculates cutoff value for x on the two sides of the symmetry line such that inside the cutoff the wavelet covers a percentage of its area, such as 99%. The detector module then sets the value of the wavelet to zero for x values outside the cutoff x values. The detector modules also truncates the wavelet in the y direction to a finite range and sets the value of the wavelet to zero beyond that range. In some embodiments, the cutoff values in the x and y direction can be set by default, and can be changed for various segments to achieve optimum results.

In some embodiments, the cutoff value in the y direction determine the length of a wavelet. In some embodiments, the detector module selects an optimum length for test wavelets by finding a length that matches the segments of the channel system. In various embodiments, the optimum length is an average length, or a minimum length of channel segments. In some embodiments, the optimum length is selected by a user or automatically determined by the detector module. In some embodiments, the detector module uses the optimum length for all test wavelets. In some embodiment, the length of a wavelet is related to the length of a segment modeled by the wavelet.

Different channel segments may also vary in their orientations. For example, in FIG. 7, exemplary channel segments 702-1, 702-2, and 702-3 do not have the same orientations. Instead, channel segments 702-1 and 702-2 are oriented vertically, while channel segment 702-3 is tilted with respect to the vertical direction by almost 45 degrees. Therefore and in various embodiments, for each of these segments, test wavelets are chosen that are oriented in approximately the same direction as the segment. For example, to model channel segments 702-1 or 702-2, test wavelets such as test wavelet 742-1 or 742-2 are respectively chosen for which the orientations are vertical or within a variation range near vertical. To model channel segment 702-3, on the other hand, test wavelets such as test wavelets 742-3 are chosen, which have a tilt angle that is the same or within the variation range of the tilt angle of channel segment 702-3.

Moreover, different channel segments may vary in their widths. For example, in FIG. 7, channel segment 702-1 has a width 704-1 that is larger than widths 704-2 and 704-3 of channel segments 702-2 and 702-3, respectively. Thus, in some embodiments, to find a wavelet that models a channel segment, test wavelets are chosen such that the wavelet widths (that is, in FIG. 7, wavelet widths 744-1, 744-2, and 744-3) are close to the corresponding segment widths. For example, in FIG. 7, for channel segment 702-1, test wavelets such as wavelet 742-1 are chosen, for which the wavelet widths (such as wavelet width 744-1) are close to segment width 704-1. Similarly, for channel segments 702-3, test wavelets such as wavelet 742-3 are chosen, for which the wavelet width (such as wavelet width 744-3) are close to segment width 704-3. In various embodiments, because the general shape of a segment is not known or is not as regular as the illustrative functions shown in FIGS. 6A and 6B, the width of a channel segment may be approximated from the spread of the intensity data in real space.

Different channel segments may also vary in other characteristics, based on which the range of parameters for the corresponding test wavelets are chosen. For example, different channel segments may vary in their smoothness, based on which the spreads of the bumps in the test wavelets are chosen.

Returning to FIG. 5A, at block 508 the detector module determines a plurality of test wavelets to fit with each segment of the channel system. In some embodiments, the detector module performs this analysis for each grid point covered by the channel system. To determine the plurality of test wavelets for each grid point, the detector module determines for the characteristics of test wavelets a range that is close to the characteristics of the segment at that grid point.

In some embodiments, the detector module first performs a coarse grained sampling of test wavelets to determine a fitting range before performing a fine tuned search within the fitting range. In some embodiments, for each channel grid point the detector module starts with finding a rough estimate of one or more of the characteristics such as the location, orientation, width, or smoothness. During the coarse grained sampling, the detector module uses a preliminary set of wavelets which have large variations in the values of one or more characteristic. For example, the detector module may include as the preliminary wavelets a plurality of wavelets that span, in large steps, a range of widths from below the lowest estimate to above the highest estimate for the segment's width. For each of these widths, the preliminary set may also include a coarse grained sampling of orientations or bump spreads. In some embodiments, the detector module performs coarse graining for the whole channel system. To that end, in some embodiments, the detector module finds a coarse grained range of widths or standard deviations and chooses preliminary wavelets within that range for all grid points For each preliminary wavelet for a grid point, the detector module finds the fit-measure. The detector module then chooses, as the best preliminary fit wavelet, one or more preliminary wavelets that provide the highest fit-measures, and chooses the characteristics of those wavelets as the best preliminary fit characteristics at that grid point. The detector module then determines, for each characteristic, a fine grained set of values that is centered around or is close to the best preliminary fit characteristics. The detector module thus determines the test wavelets for the grid point as the set of wavelets for which each characteristic is chosen from this fine grained set of characteristic values.

At block 510, for each grid point, the detector module calculates the fit-measures for the set of test wavelets determined for that grid point. In some embodiments, to that end the detector module calculates the SNR for the test wavelets with respect to the channel segment associated with the grid point.

At block 512, for each grid point the detector module determines, from among the test wavelets, a selected wavelet that fits best the channel segment at that grid point. In some embodiments, the selected wavelet is the wavelet with the highest fit-measure. According to some embodiments, the detector module uses the selected wavelet for each grid point as a model of the channel segment at that grid point.

Figure 5B:
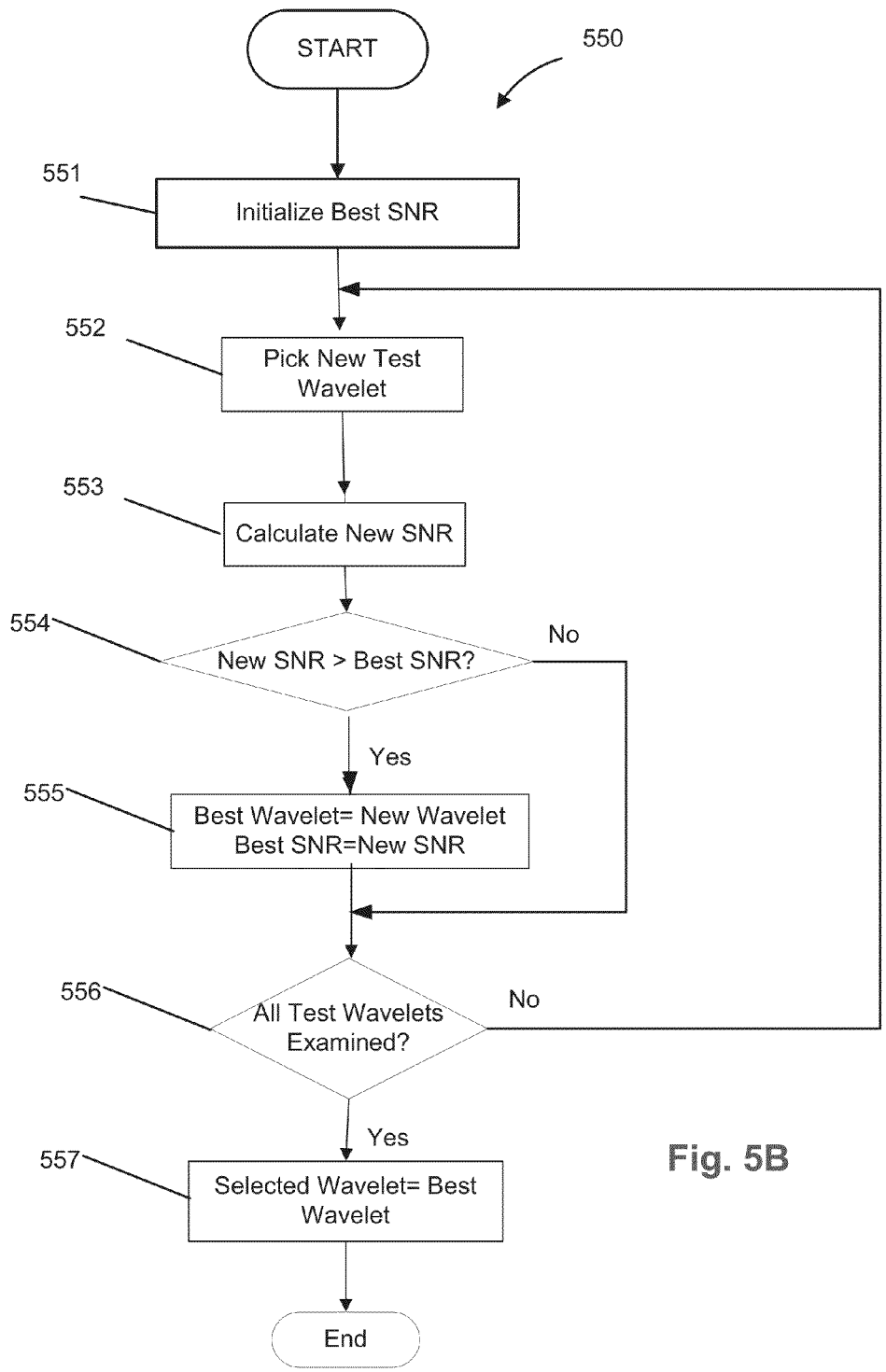

FIG. 5B shows a flow chart 550 detailing operations of blocks 510 and 512 in accordance with some embodiments. In particular, flow chart 550 shows steps performed by the detector module to loop over test wavelets and select the best fit wavelet based on the values of SNR, according to some embodiments. In various embodiments, the detector module performs flowchart 550 for each grid point. In some embodiments, the detector module performs flowchart 550 for a subset of grid points that overlap with channel system data.

In block 551, the detector module sets an initial value for the best SNR value. The best SNR value at each point of the process is the value of the SNR for the best fit wavelet found up to that point. In some embodiments, the initial value for the best SNR is set below the minimum possible SNR. In some embodiments, the initial value is set to zero.

In block 552-556, the detector module iterates over the test wavelets. In particular, in block 552 of each iteration, the detector module picks from the set of test wavelets a new wavelet that has not previously been examined. In block 553, the detector module calculates, as a new SNR, the SNR for the new wavelet with respect to the channel segment associated with the grid point.

In decision block 554, the detector module determines whether the new SNR is larger than the best SNR, as calculated up to this iteration. A new SNR that is larger than the best SNR indicates that the new test wavelet is a better fit compared to the previously examined test wavelets. In this case (decision block 554: Yes), the detector module proceeds to block 555, selects the test wavelet as the best wavelet, and replaces the best SNR with the new SNR. Alternatively, if the new SNR is not larger than previously stored best SNR (decision block 554: No), the detector module skips block 555.

In decision block 556, the detector module checks whether all of the test wavelets have been examined. If not (decision block 556: No), the detector module returns to block 552 and starts a new iteration by picking a new test wavelet. Otherwise, if all test wavelets for the channel segment have been examined (decision block 556: Yes), the detector module exits the iteration and proceeds to block 557. In block 557, the detector module selects the best wavelet found during the iterations as the selected wavelet.

Therefore, in various embodiments and as shown through flowchart 500, the detector module receives data for a channel system and delivers selected wavelets, each of which model a segment of the channel system. In various embodiments, the detector module delivers selected wavelets for each grid point, or for a subset of the grid points, which overlap the channel system.

In various embodiments, each selected wavelet includes information that include one or more of location, orientation, width, and smoothness that are associated with the corresponding characteristics of the modeled segment. In this manner, the detector module detects channel segments and their characteristics using wavelets. Further, for each selected wavelet, the detector module calculates a fit-measure, which quantitatively measures the degree to which the selected wavelet fits the corresponding channel segment. In some embodiments, the fit-measure includes an SNR value.

Figure 8A:
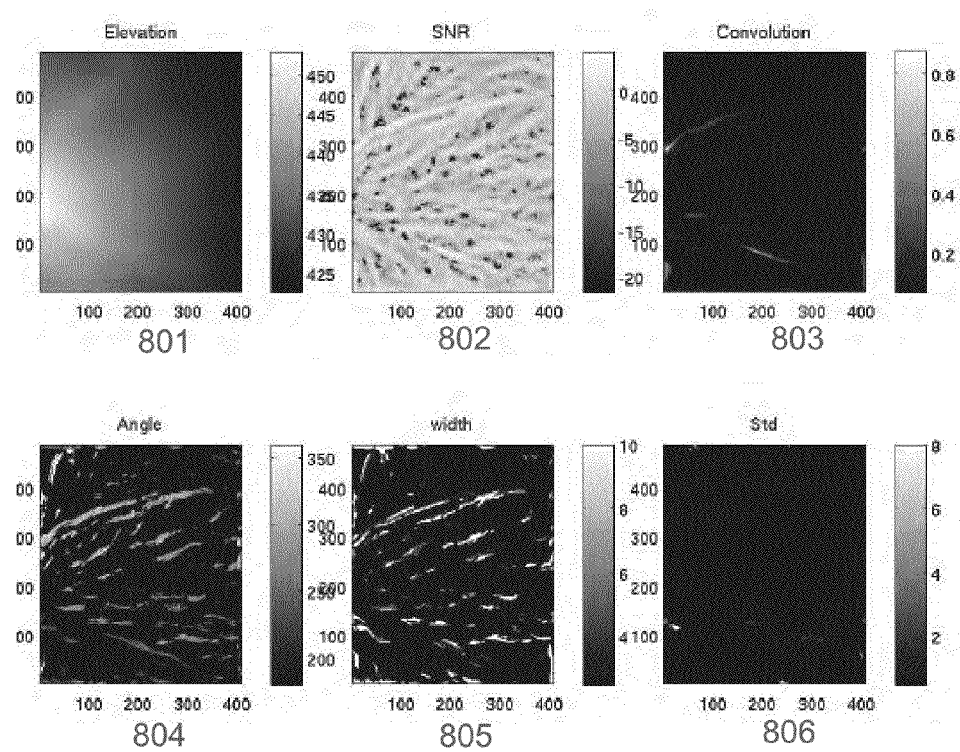
FIGS. 8A and 8B shows inputs and outputs of a detector module according to various embodiments.

FIG. 8A shows the channel system data provided to a detector module and the data delivered by the detector module according to some embodiments. In particular, FIG. 8A shows intensity data in image 801, which are used by the detector module for its detection process. In the embodiment shown in FIG. 8A, intensity data image 801 shows elevation data in a grayscale format. After analyzing these data, the detector module derives information such as those shown in images 802-806. Images 802-806 depict the results of wavelet analysis. In particular, each point in images 802-806 corresponds to a grid point with the same coordinates in the surface shown in image 801. Further, at each point, the corresponding data is shown using a grayscale mechanism, as indicated by the legend in each image.

In particular, image 802 shows the fit-measure of the selected wavelets at the local positions of the selected wavelets. In image 802, the fit-measure is the SNR value of the selected wavelet. Image 803 shows the results of the value of the convolution of the selected wavelet with the channel system data. Images 804, 805, and 806 respectively depict the values of angle of orientation, width, and standard deviation for the selected wavelets.

Figure 9A:
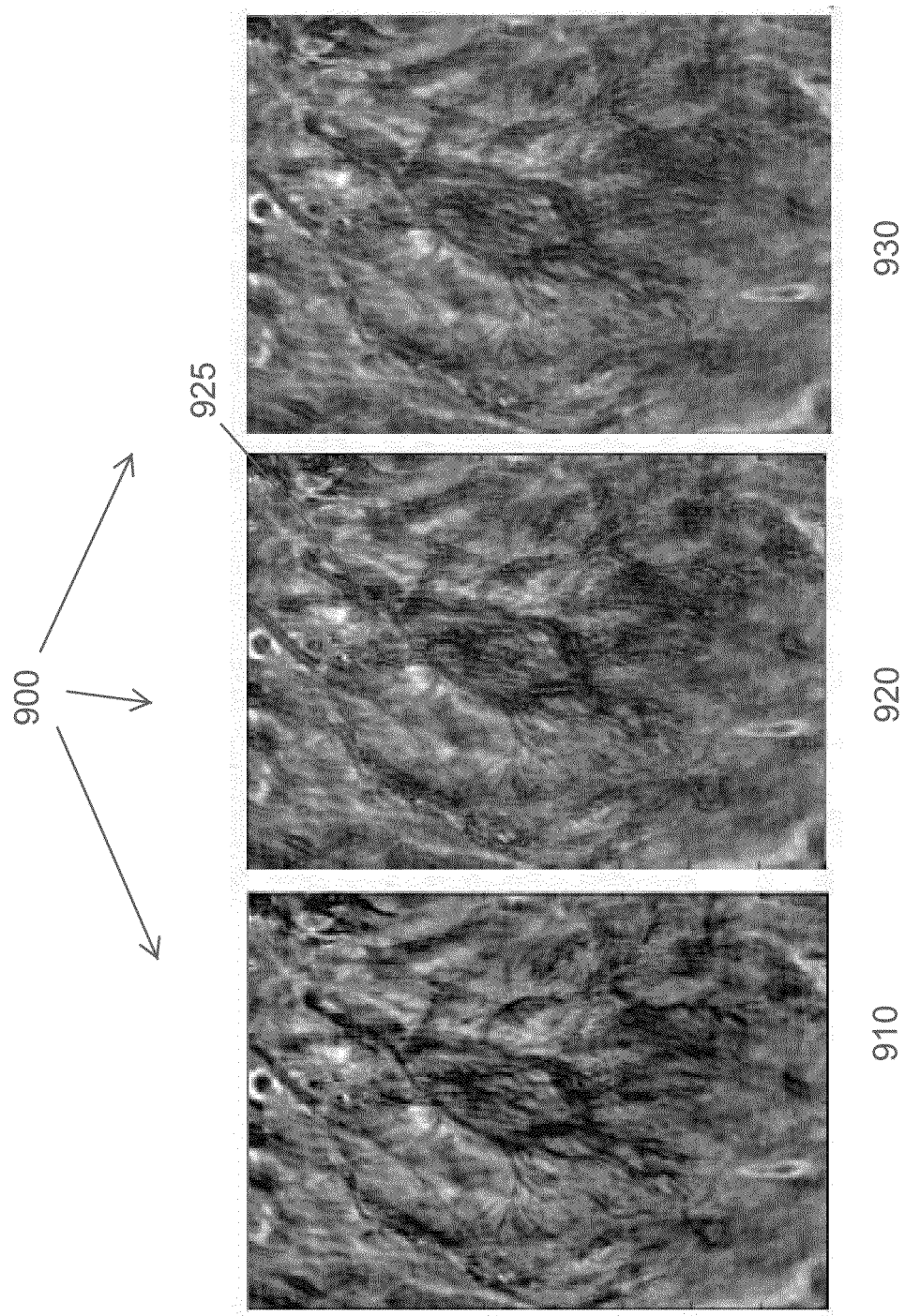
FIGS. 9A and 9B depict channel system data and the segments and connected channel system detected and modeled by the channel detector system, according to some embodiments.

FIG. 9A depicts a channel system 900 and the segments detected by the detector module, according to some embodiments. In particular, channel image 910 shows a seismic image of channel system 900. The seismic data associated with channel image 910 are provided to the detector module as an input.

The detector module processes the channel system data and detects the segments using wavelets, in the manner discussed above. The detector module outputs, among other information, selected wavelets for a plurality of grid points. Image 920 depicts the upper 10 percentile of the SNR values colored depicted in blobs and draped over the seismic data. Image 920 illustrate the correspondence between these high SNR values and the visually detected channels.

In some embodiments, the detector module only selects a subset of the grid points for which the fit-measure is above a cut-off threshold and excluded the rest. In image 920 of FIG. 9A, for example, the detector module has selected the grid points within the top ten percent of the SNR. In such an image, a set of grid points that join each other define a connected portion of a channel system. In some embodiments, various portions are disconnected from each other and thus may not provide a full image of the channel system.

In various embodiments, the channel detection system connects the disconnected portions to provide a connected model of the channel system. In some embodiments, the connector module receives data and provides a connected channel model. In some embodiments, the data received by the connector module include the data depicted in one or more of the images 802-806 and 920.

Figure 10A:
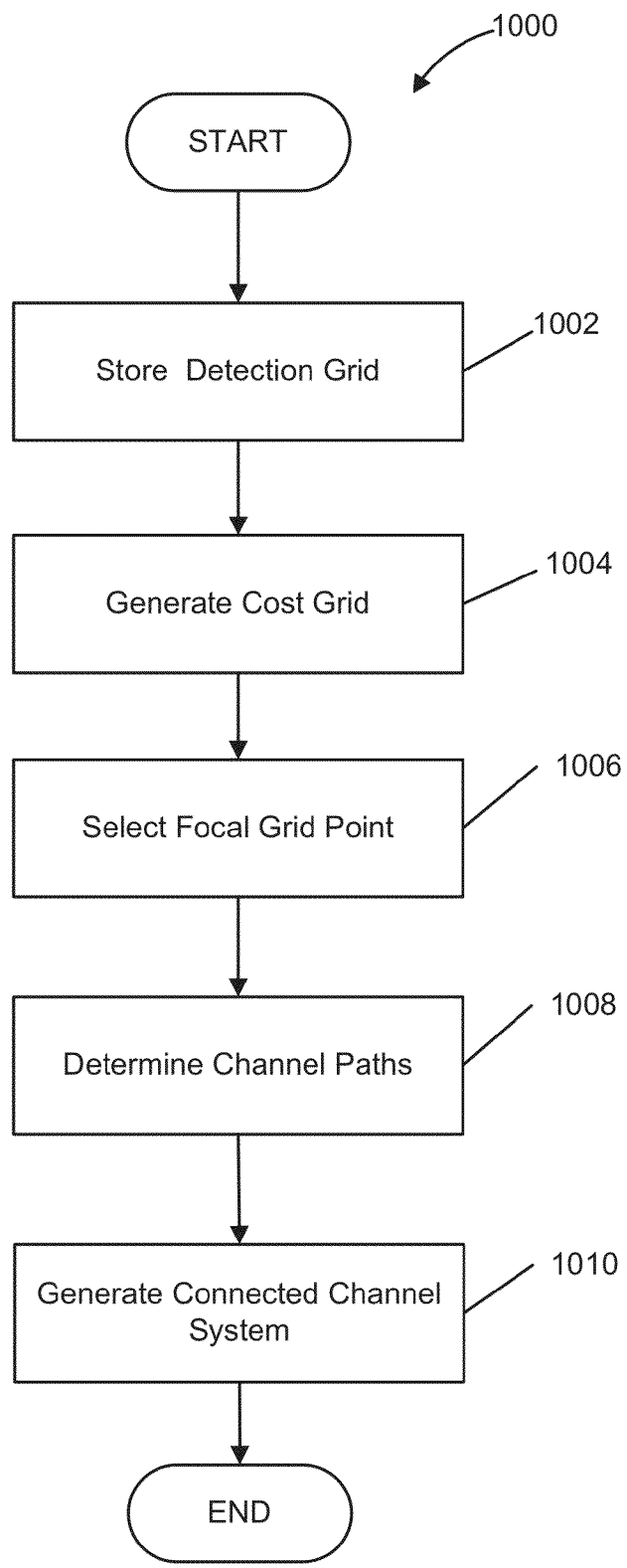
FIG. 10A shows a flow chart for detecting and modeling a connected channel system according to some embodiments.

FIG. 10A shows a flow chart 1000 for detecting and modeling a connected channel system according to some embodiments. In some embodiments, flow chart 1000 is performed by a system such as channel detection system 400. In some embodiments, flow chart 1000 is performed by a channel connector such as connector module 430. In various embodiments, the connector module generates a model of the connected channel system by connecting a subset of the disconnected grid points. In some embodiments, the connector module connects subsets of the disconnected grid points by connecting path.

In block 1002, the connector module stores a detection grid. In various embodiments, a detection grid includes a regular grid. In some embodiments, the connector module creates a detection grid covering the surface area of the channel system. In some embodiments, the detection grid is a regular grid, created by dividing each of the horizontal and vertical axes into equal sections. In some embodiments, a selected wavelet is associated with each of a subset of grid points in the detection grid. In some embodiments, the connector module receives the data associated with the detection grid from the detector module.

In various embodiments, the connector module receives data for the localized wavelets associated with a subset of the grid points from a segment detector such as detector module 420. In some embodiments, the localized wavelets are the selected wavelets found by the detector module.

In various embodiments, the connector module assigns to the grid point various characteristics of the wavelet. In some embodiments, those characteristics include one or more of the fit-measure, the orientation, the width, and the spread of the wavelet assigned to the grid point. In some embodiments, the fit-measure is an SNR value of the wavelet.

Figure 8B:
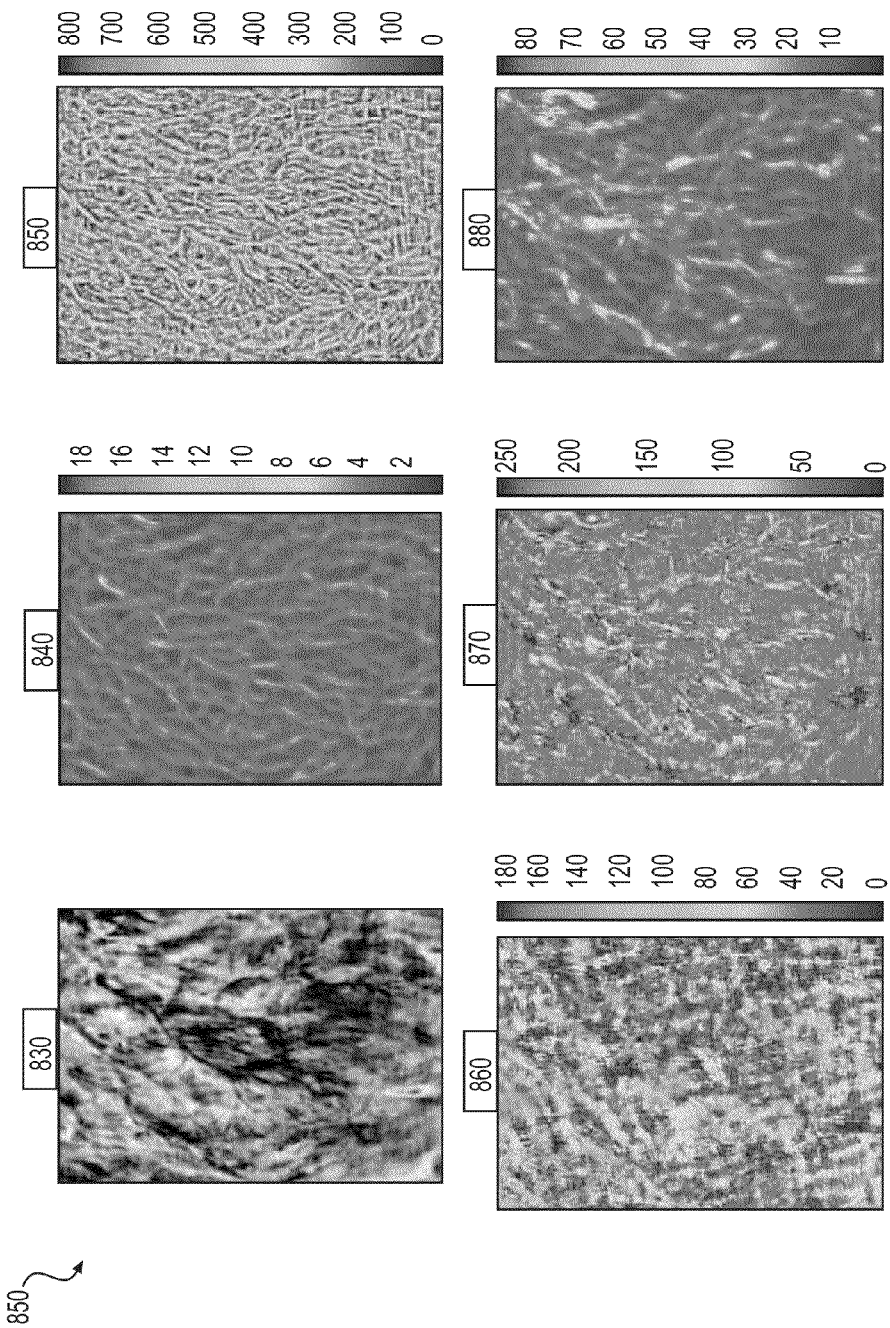

FIG. 8B illustrates an image of a channel system 850 and various characteristics measures assigned to the grid points according to an embedment. In particular, image 830 is a seismic image of channel system 850. Further, image 840 shows a distribution of SNR values, image 850 shows a distribution of widths, image 860 shows a distribution of orientation angles, image 870 shows a distribution of morphologic ages, and image 880 shows a distribution of heights, each derived from wavelets modeling channel system 850.

In block 1004, the connector module generates a cost grid. To that end, in some embodiments, the connector module assigns costs to a subset of the grid points. In some embodiments, a cost assigned to a grid point is a decreasing function of the probability that the grid point is part of the connected channel system. In some embodiments, the cost is a decreasing function of the fit-measure assigned to the grid point. In some embodiments, the cost assigned to a grid point is inversely proportional to the SNR assigned to the grid point.

In various embodiments, the connector module assigns costs to the links in the grid. In some embodiments, a link is line connecting two grid points, and thus associated with those grid points. In some embodiments the links are connections between two neighboring grid points. In some embodiments, the connector module generates a cost grid for the links as a union of multiple link-cost grids. In some embodiments, each of the multiple link-cost grids assigns to a grid point a cost of a link that connects that grid points to one of its neighbors. In some embodiments, each grid point has eight neighbors and the cost grid for the links is a union of eight link-cost grids.

In some embodiments, a cost assigned to a link is a decreasing function of the probability that the link is part of the connected channel system or, alternatively, that the two grid points associated to the link should be connected in a model of the connected channel system. In some embodiments, the cost assigned to a link is an average of the costs assigned to its associated grid points.

In some embodiments, the cost assigned to a link is an increasing function of the difference between one or more of the characteristic values assigned to its associated grid points. For example, in some embodiments, a cost assigned to a link is a weighted sum of one or more of the absolute values of the differences between the fit-measures, the orientations, the widths, and the spreads assigned to the associated grid points.

In some embodiments, the connector module blocks a grid point or a link from being included in a channel path. In some embodiments, the connector module blocks a grid point or a link if violates a constraint. In some embodiments, the connector module blocks a link if the difference between one or more of the characteristic values assigned to its associated grid points exceed a threshold. In some embodiments, the connector module does not include a blocked grid point or a blocked link when examining various path to find a channel path. In some embodiments, the connector module blocks all grid points for which a cost value exceeds a threshold value. In some embodiments, the connector module blocks a grid point or a link by assigning to it a very high cost. In various embodiments, the connector module blocks a grid point or a link by excluding it from consideration when considering various possible paths for the channel system.

Figure 9B:
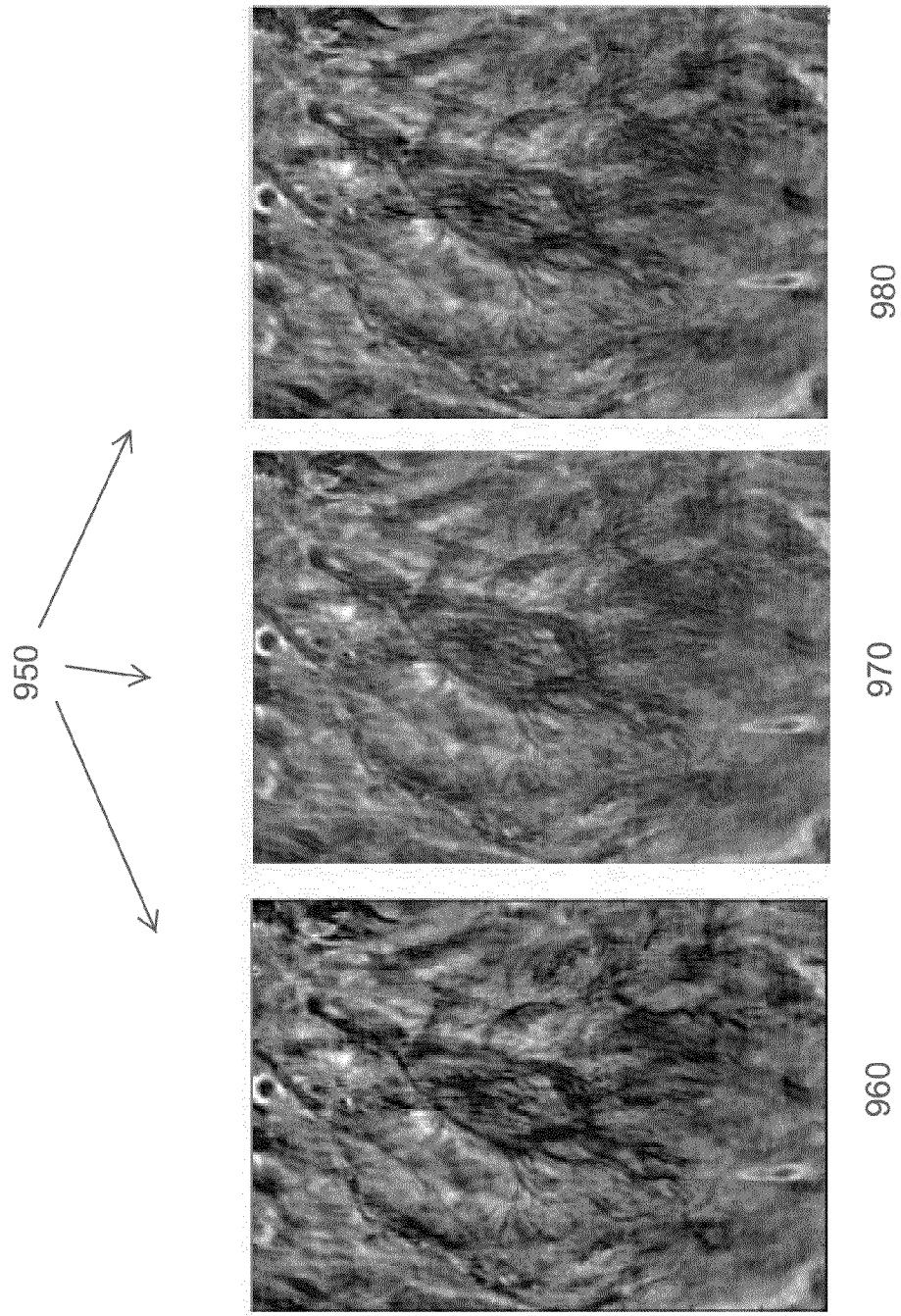

FIG. 9B depicts a channel system 950 and the associated connected channel system using various constraints. In particular, channel image 960 shows a seismic image of channel system 950. Images 970 and 980 show results of deriving connected channel systems upon applying two different sets of constraints. In image 970, the Dijkstra method is applied to a cost grids based on the inverse of all the SNR values. In image 980, the Dijkstra method is applied with the two constraints. The first constraint includes selecting the upper sixty percentile of the SNR values. The second constraints includes blocking a link between neighboring grid points for which the difference between the assigned angles are more than thirty degrees.

In some embodiments, the connector module selects a portion of grid points or links that have the lowest cost and excludes the rest. In one embodiment, for example, the connector module selects the grid points within the ten percent of the lowest cost grid points and excludes the rest. In various embodiments, the connector module may try various versions of a constraint to find the best model for the channel system. In some embodiments, the connector module tries different values of the thresholds for one or more constraints to achieve the best results.

Figure 10B:
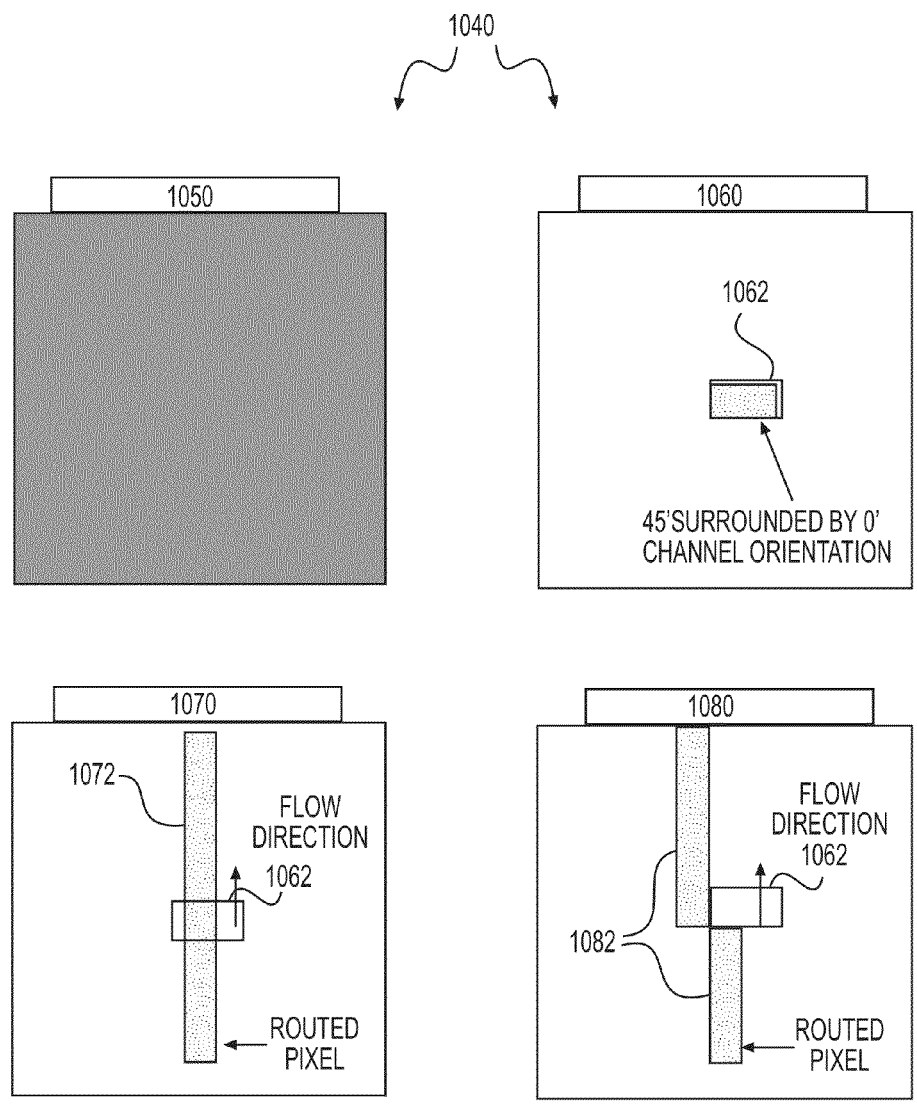
FIG. 10B illustrates the process of blocking a link according to an embodiment.

FIG. 10B illustrates the process of blocking a link for a grid map 1040 according to an embodiment. FIG. 10B includes an orientation independent cost map 1050, an orientation grid map 1060, and maps 1070 and 1080 respectively showing an unconstrained channel path and a constrained channel path.

In orientation grid map 1060 an orientation is assigned to each grid point. For grid point 1062 the orientation is 45 degrees. For each neighbor of grid point 1062, on the other hand, the orientation is 0 degrees.

In the example of FIG. 10B, the connector module blocks grid point 1062 due to a constraint. Unconstrained path map 1070 shows an unconstrained channel path 1072 generated by the connector module for grid map 1040. In particular, the connector module includes grid point 1062 in unconstrained channel path 1072. Constrained path map 1080, on the other hand, shows a constrained channel path 1082 generated by the connector module for grid map 1040. In the embodiment shown in map 1080, the connector module sets a constraint on the difference between orientations of connecting grid points. In particular, according to the constraint, a link is blocked if the difference between orientations of the corresponding grid points exceeds 40 degrees. Under this constraint, a channel path cannot include a link connecting grid point 1062 with any of its neighbors. Therefore, grid point 1062 is blocked from being included in a channel path. As seen in map 1080, the connector module blocks grid point 1062 from being included in the channel path. The connector module thus generates a channel path 1082 which excludes grid point 1062.

In various embodiments, the connector module generates connected paths among the grid points by connecting a subset of the grid points. To that end and according to some embodiments, in block 1006 of flow chart 1000 the connector module selects a focal grid point for a connected channel. A focal grid point is a grid point at which the branches of the channel system end. For example, in a tributary system, a focal point is a point to which all channels ultimately converge. Alternatively, in a distributor system, a focal point is a point from which all channels diverge. In image 920, for example, a point 925 is a focal point for channel system 924.

In various embodiments, a focal point is found by visual inspection or by automated methods. In some embodiments, a focal point is found by a user after visual inspection of the channel system and indentifying a point in which the branches of the channel system end. In various embodiments, a focal point is found automatically by the connector module. In some embodiments, the connector module finds a focal point based on the orientation of the wavelets in the channel system. To that end, in some embodiments, the connector module draws a tangent line to each wavelet along its orientation. In some embodiments, the connector module draws a tangent line to a branch. The connector module then finds a point in the grid towards which a majority of the tangent lines converge.

In various embodiments, the connector module may initially find more that one candidate for the focal point in the same channel system. In some embodiments, the connector module selects one of those candidates as the focal point. The connector module may further assign low costs to a subset of the remaining candidates, in order to increase the probability that the channel paths cross those candidates as well. In some embodiments, the connector module defines a focal bar by connecting the candidates. The connector module then assigns a low cost to a subset or all of the grid points located on the focal bar. This assignment increases the probability that the channel paths, which end at the focal point, also overlap with all or some of the grid points in the focal bar.

In block 1008, the connector module determines one or more channel paths, according to various embodiments. In some embodiments, each channel path is a path that connects a focal point to another grid point in the grid. In various embodiments, a channel path is determined based on the cost grid. In some embodiments, a channel path is an optimum path selected from among various possible paths between the starting point and the focal point.

In some embodiments, to determine the channel paths, the connector module uses the cost grid and applies the Dijkstra algorithm of finding the "least cost path". In some embodiments, the connector module selects a grid point of the plurality of grid points and finds a path that optimally connects the focal grid point to the selected grid point based on the Dijkstra algorithm. In applying the Dijkstra algorithm, the connector module uses the link costs on the grid point.

In some embodiments, the connector module repeats the above process by selecting a subset of grid points and determining a channel path connecting focal grid point to each selected grid point. In some embodiments, after determining a path to one grid point, the connector modules uses that path in finding one or more of the paths to grid points selected afterwards. In some embodiments, thus, a subset of the paths determined after a first path extend that first path.

In block 1010, the connector module generates a connected channel system by combining the determined channel paths. In various embodiments, a subset of the determined channel paths converge such that some sections of them overlap, or some of them are fully included in others. In some embodiments, the connector module also includes the selected wavelets in the information for the connected channel system.

In FIG. 9, connected channel image 930 illustrates the results of the analysis by the connector module according to an embodiment. The connector module analyzes data of disconnected wavelets, such as image 920, and generates a model of a connected channel system such as that shown in connected channel image 930. The connector module connects disconnected portions, such as those shown in image 920, via channel paths to generate a connected channel system, such as that shown in connected channel image 930. Connected channel image 930 thus includes a model of a connected channel for channel system 900.

In some embodiments, channel detection system 400 further analyzes the results of modeling the channel system and provides some statistical analysis of the channel system. In particular, in some embodiments, analyzer module 440 analyzes the data provided by detector module 420 and connector module 430. In various embodiments, the analyzer module derives various statistics to characterize the channel system and analyzes the derived data.

Figure 11:
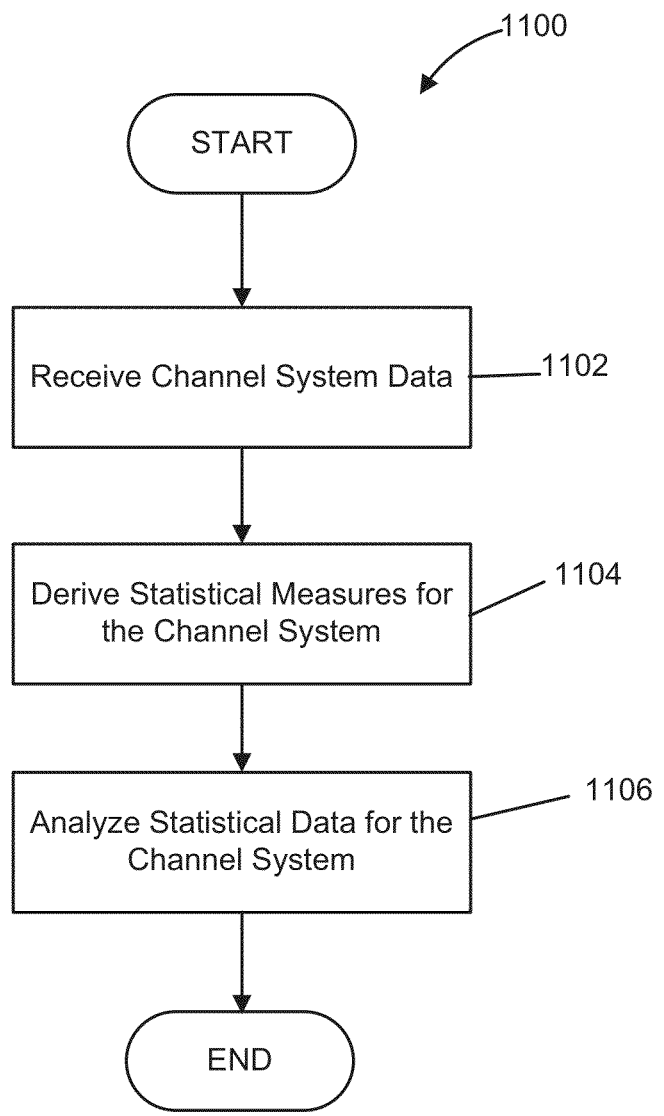
FIG. 11 shows a flowchart for deriving and analyzing the statistical data for a channel system.

FIG. 11 shows a flowchart 1100 for deriving and analyzing the statistical data for a channel system. In some embodiments, flowchart 1100 is performed by analyzer module 440. In block 1102, the analyzer module receives data related to the channel system. In various embodiments, the analyzer module receives these data from the detector module or from the connector module. In some embodiments, the received data include data related to the selected wavelets or channel paths which model the channel system.

In block 1104, the analyzer module derives statistical measures for the channel system. In some embodiments, the derived statistical measures include estimated age of various sections. In various embodiments, the analyzer module derives an estimated age of the channel systems or its sections based on the modeling data. In some embodiments, the estimated geomorphic age of a channel segment is derived from the parameters of the selected wavelet for the channel segment. In particular, in some embodiments a wavelet that models the channel segment is derived from a diffusion model and an estimated age of a channel segment is a morphologic age parameter of the wavelet, which is related to its smoothness.

Figure 12:
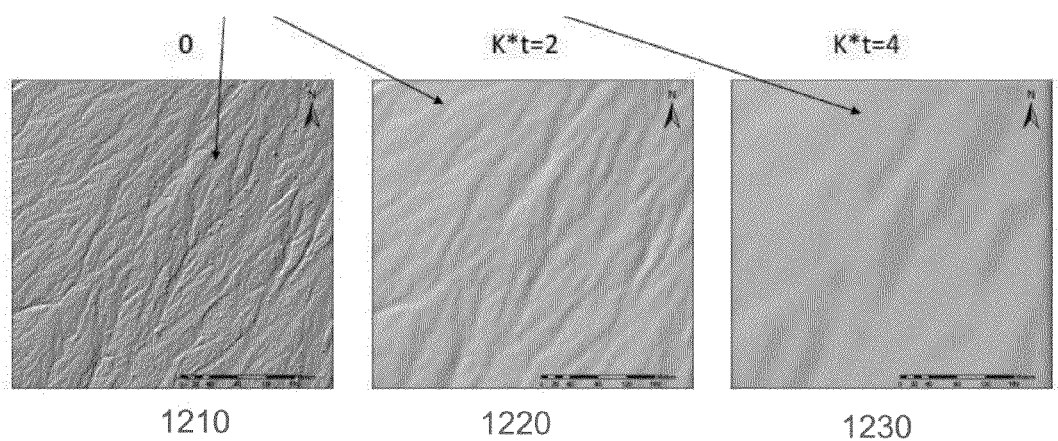
FIG. 12 depicts the effect of the morphologic age parameter on the smoothness of various surfaces of a channel system according to some embodiments.

FIG. 12 depicts the effect of the morphologic age parameter on the smoothness of the surfaces a channel system according to some embodiments. In particular, FIG. 12 shows three images of channel systems 1210, 1220, and 1230, with increasing values of morphologic age parameter $k*t$. In particular, the value of the morphologic age parameter is 0 in image 1210, 2 in image 1220, and 4 in image 1240. As seen in FIG. 12, as $k*t$ increases, the smoothness of the surface increases, and the contrasts between various sections decrease.

In some embodiments, the analyzer module derives other statistical measures for sections of a channel system or the entire channel system using a stream analogy. The statistical measures include elevation values, channel order, and drainage area. In various embodiments, the channel system is analogized with a stream conducting a flow.

Figure 13:
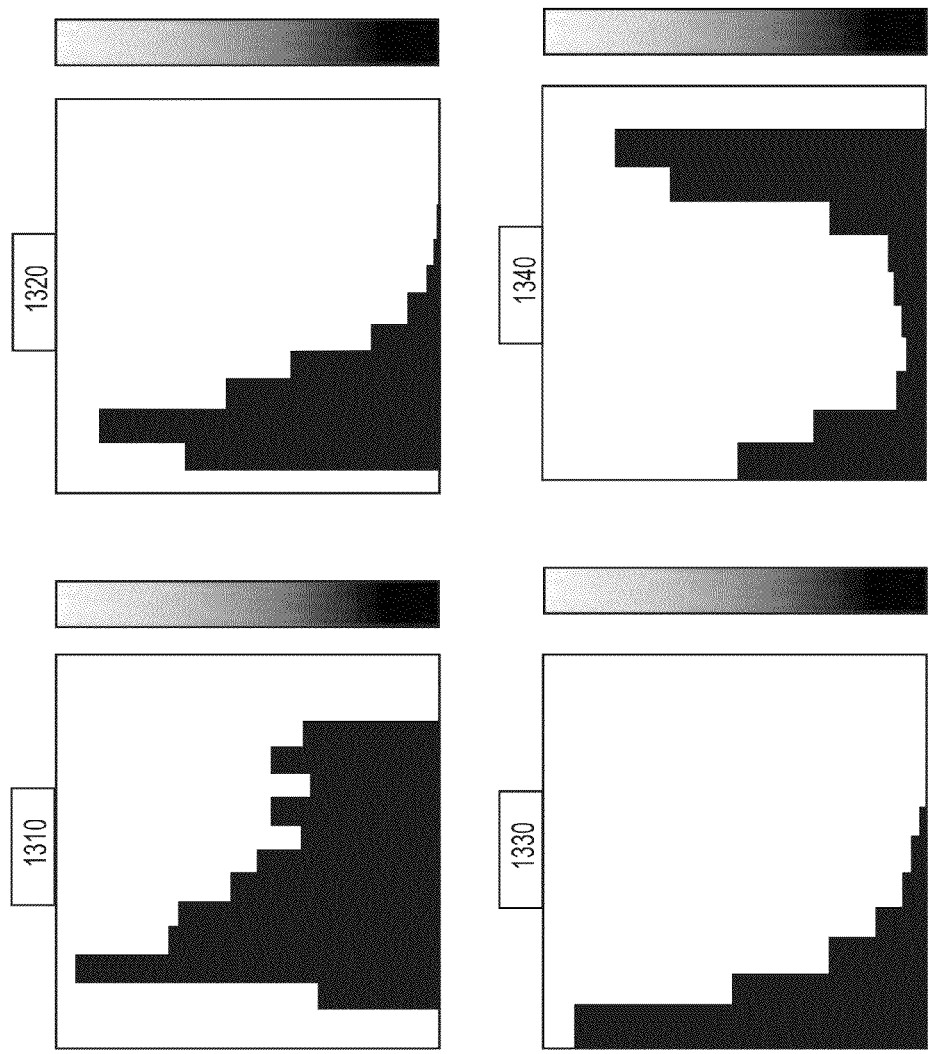
FIG. 13 illustrates various statistical measures derived for a channel system according to an embodiment.

FIG. 13 illustrates various statistical measures derived for a channel system according to an embedment. In particular, image 1310 shows, for the channel system, a distribution of widths, image 1320 shows a distribution of reliefs, image 1330 shows a distribution of aspect ratios, that is, ratios of width to height, and image 1340 shows a distribution of angles. In various embodiments, a relief is the elevation, or more generally, the intensity difference between the channel and its surrounding; and aspect ratio is the ratio of channel width to channel depth In various embodiments, an analogy to a stream is generated based on the generated paths. In some embodiments, a path-cost-grid generated by the connector module produces higher path-costs as one moves away from the focal point. In these embodiments, the path-cost can be analogous to elevation, and an elevation grid can be drawn based on the path cost. In such an elevation grid, the focal point is the lowest point, and the points of high cost far away from the focal point are the high elevation hill tops. In such embodiments, the path-cost grid servers as a template for a set of algorithms used to analyze channel networks from topographic maps. Such algorithms include the calculation of a drainage area of a grid point, which is the summation of the number of other grid points that flow into that grid point. Hence, the lower points in the stream generally have a higher drainage areas. Moreover, in some embodiments, a flow length is defined as a measure of the longest path from the furthest hill-top in the drainage basin to a point of interest.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments. Accordingly, the invention is not limited to the above-described embodiments, but instead is defined by the appended claims in light of their full scope of equivalents.

The invention claimed is:

1. A computer implemented method for detecting a channel system, the method comprising:
   importing channel data, wherein the channel data includes intensity measurements associated with locations in the channel system;
   calculating, by a processor, directional first derivative data of the intensity measurements;
   selecting a plurality of localized test wavelets;
   calculating, by the processor, a plurality of fit-measures, wherein the plurality of fit-measures indicate correlations between the directional first derivatives and the plurality of localized test wavelets; and
   determining a plurality of selected wavelets from the plurality of localized test wavelets based on the plurality of fit-measures, wherein the plurality of selected wavelets model the channel system.

2. The method of claim 1, wherein each of the plurality of selected wavelets is centered at a corresponding point of the channel system and has an orientation that is perpendicular to a direction of a corresponding directional first derivative at the corresponding point.

3. The method of claim 1, wherein the plurality of localized test wavelets include a plurality of wavelets having different orientations.

4. The method of claim 1, wherein the plurality of localized test wavelets include a plurality of wavelets having different widths.

5. The method of claim 1, wherein the channel data correspond to a plurality of grid points and the plurality of selected wavelets are assigned to the plurality of grid points, the method further comprising calculating a plurality of signal to noise values for each of the plurality of grid points, wherein a signal to noise value for one grid point is an increasing function of the calculated fit-measure of the selected wavelet assigned to the one grid point.

6. The method of claim 1, wherein calculating the plurality of fit-measures include calculating a plurality of convolutions.

7. The method of claim 6, wherein calculating the plurality of convolutions is performed in a Fourier space.

8. The method of claim 1, wherein calculating a plurality of fit-measures includes:
   calculating a first fit-measure between the directional first derivatives and a first test wavelet localized at one location in the channel system; and
   calculating a second fit-measure between the directional first derivatives and a second test wavelet that is localized at the one location and is different from the first wavelet;
   and wherein determining the plurality of selected wavelets includes selecting, as a selected wavelet, one of the first test wavelet and the second test wavelet for which the corresponding calculated fit-measure is larger.

9. A computer implemented method for analyzing data for a channel system, wherein the data correspond to a plurality of grid points that represent a surface containing the channel system, the method comprising:

storing a plurality of fit-measures assigned to the plurality of grid points, wherein the plurality of fit-measures indicate correlations between a plurality of wavelets and directional first derivates of the data for the channel system;

determining a plurality of links connecting a subset of the plurality of grid points;

assigning to a subset of the plurality of links a plurality of link costs, wherein the plurality of link costs are based on the plurality of fit-measures;

selecting a focal grid point; and determining, by a processor, a plurality of channel paths each connecting the focal grid point to one of a subset of the plurality of grid points, wherein the plurality of channel paths is determined based on the plurality of link costs.

10. The method of claim 9, wherein determining the plurality of channel paths from the focal grid point to one grid point of the plurality of grid points includes:

determining a plurality of paths from the focal grid point to the one grid point;

assigning to each of the plurality of paths a path cost, wherein the path cost for one path is an increasing function of a subset of the link costs for links covered by the one path;

based on the path costs, selecting a path among the plurality of paths as the determined channel path from the focal grid point to the one grid point.

11. The method of claim 10, wherein the selected path has a minimum path cost among the plurality of paths.

12. The method of claim 9 further comprising:

assigning a plurality of wavelet parameters to the plurality of grid points; and increasing a link cost for one link of the plurality of links based on a difference between values of wavelet parameters for the grid points connected by the one link.

13. A system for detecting a channel system, the system comprising:

a detector module configured to:

import channel data, wherein the channel data includes intensity measurements associated with locations in the channel system;

calculate directional first derivative data of the intensity measurements;

selecting a plurality of localized test wavelets;

calculate a plurality of fit-measures, wherein the plurality of fit-measures indicate correlations between the directional first derivatives and the plurality of localized test wavelets; and determine a plurality of selected wavelets from the plurality of localized test wavelets based on the plurality of fit-measures, wherein the plurality of selected wavelets model the channel system.

14. The system of claim 13, further comprising a connector module for analyzing data for the channel system, wherein the data correspond to a plurality of grid points that represent a surface containing the channel system, wherein the connector module is configured to:

store a plurality of fit-measures assigned to the plurality of grid points, wherein the plurality of fit-measures indicate correlations between a plurality of wavelets and directional first derivates of the data for the channel system;

determine a plurality of links connecting a subset of the plurality of grid points;

assign to a subset of the plurality of links a plurality of link costs, wherein the plurality of link costs are based on the plurality of fit-measures;

select a focal grid point; and determine a plurality of channel paths each connecting the focal grid point to one of a subset of the plurality of grid points, wherein the plurality of channel paths is determined based on the plurality of link costs.

15. The system of claim 13, wherein one wavelet is assigned to one grid point of the plurality of grid points and wherein one wavelet parameter assigned to the one grid point includes a width of the one wavelet, a standard deviation of the one wavelet, or an orientation of the one wavelet.

16. The system of claim 13 further comprising setting a constraint on a subset of the plurality of grid points or on a subset of the plurality of links based on the plurality of wavelet parameters, wherein one or more of the plurality of channel paths satisfies the constraint.

17. The system of claim 16, wherein the constraint includes blocking the subset from being included in a subset of the plurality of channel paths.

18. The system of claim 17, wherein a link connecting a first grid point and a second grid point neighboring the first grid point is blocked from being included in a channel path if a difference between values of one wavelet parameter for the first and second grid points exceeds a threshold difference value.

19. The method of claim 9, wherein determining the plurality of channel paths includes removing a subset of the plurality of links from being included in the plurality of channel paths, wherein for each link in the subset of the plurality of links the link cost exceeds a link cost maximum.

20. The method of claim 9, wherein determining one of the plurality of channel paths from the focal point to one grid point of the plurality of grid points includes determining a lowest cost path from the focal point to the one grid point using a Dijkstra algorithm.

21. The method of claim 9, further comprising:

assigning to a subset of the plurality of links a plurality of focal link costs, wherein the plurality of focal link costs are below a threshold cost value; and determining, by a processor, the plurality of channel paths such that a subset of the plurality of channel paths overlap one or more of the low-cost subset of the plurality of links.

22. The method of claim 9, further comprising assigning statistical measures to the channel system.

23. The method of claim 22, wherein the statistical measures comprise channel orders, channel widths, channel lengths, or number of first order basins.

24. The method of claim 22, wherein assigning statistical measures comprises assigning stream directions to a subset of the plurality of channel paths and drainage areas to a subset of the plurality of grid points, wherein a drainage area assigned to one grid point is proportional to a number of grid points that are located on the same channel path as the one grid point and are upstream on that channel path compared to the one grid point.

25. The method of claim 22, wherein a test wavelet is based on a diffusion function and wherein the statistical measures include a morphologic age of a wavelet included in the channel system.

26. The method of claim 9, wherein the plurality of fit-measures are a plurality of signal to noise ratios.

27. A system for analyzing data for a channel system, wherein the data correspond to a plurality of grid points that represent a surface containing the channel system, the system comprising a connector module, wherein the connector module is configured to:
- store a plurality of fit-measures assigned to the plurality of grid points, wherein the plurality of fit-measures indicate correlations between a plurality of wavelets and directional first derivates of the data for the channel system;
- determine a plurality of links connecting a subset of the plurality of grid points;
- assign to a subset of the plurality of links a plurality of link costs, wherein the plurality of link costs are based on the plurality of fit-measures;
- select a focal grid point; and
- determine a plurality of channel paths each connecting the focal grid point to one of a subset of the plurality of grid points, wherein the plurality of channel paths is determined based on the plurality of link costs.

28. A non-transitory computer-readable medium storing instructions that, when executed by one or more computers, causes the one or more computers to perform a method for detecting a channel system, the method comprising:
- importing channel data, wherein the channel data includes intensity measurements associated with locations in the channel system;
- calculating, by a processor, directional first derivative data of the intensity measurements;
- selecting a plurality of localized test wavelets;
- calculating, by the processor, a plurality of fit-measures, wherein the plurality of fit-measures indicate correlations between the directional first derivatives and the plurality of localized test wavelets; and
- determining a plurality of selected wavelets from the plurality of localized test wavelets based on the plurality of fit-measures, wherein the plurality of selected wavelets model the channel system.

29. A non-transitory computer-readable medium storing instructions that, when executed by one or more computers, causes the one or more computers to perform a method for analyzing data for a channel system, wherein the data correspond to a plurality of grid points that represent a surface containing the channel system, the method comprising:
- storing a plurality of fit-measures assigned to the plurality of grid points, wherein the plurality of fit-measures indicate correlations between a plurality of wavelets and directional first derivates of the data for the channel system;
- determining a plurality of links connecting a subset of the plurality of grid points;
- assigning to a subset of the plurality of links a plurality of link costs, wherein the plurality of link costs are based on the plurality of fit-measures;
- selecting a focal grid point; and
- determining, by a processor, a plurality of channel paths each connecting the focal grid point to one of a subset of the plurality of grid points, wherein the plurality of channel paths is determined based on the plurality of link costs.

* * * * *